(12) United States Patent
Filipovic et al.

(10) Patent No.: US 7,876,867 B2
(45) Date of Patent: Jan. 25, 2011

(54) INTERMODULATION DISTORTION DETECTION AND MITIGATION

(75) Inventors: Daniel F. Filipovic, Solana Beach, CA (US); Christos Komninakis, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 781 days.

(21) Appl. No.: 11/693,968

(22) Filed: Mar. 30, 2007

(65) Prior Publication Data

US 2008/0039045 A1 Feb. 14, 2008

Related U.S. Application Data

(60) Provisional application No. 60/836,608, filed on Aug. 8, 2006.

(51) Int. Cl.
*H03D 1/06* (2006.01)
*H04L 27/06* (2006.01)

(52) U.S. Cl. .................... 375/346; 375/343

(58) Field of Classification Search ............ 375/219, 375/222, 254, 271, 274, 278, 279, 284, 285, 375/295–297, 316, 342; 341/118, 120; 324/624; 455/63.1, 67.11, 73, 78, 83, 114.2, 114.3, 455/295–296, 501, 63, 114.1, 310, 500; 370/276, 278, 282; 327/317, 355, 362

See application file for complete search history.

(56) References Cited

U.S. PATENT DOCUMENTS

| | | | | |
|---|---|---|---|---|
| 5,093,637 A | * | 3/1992 | Isota et al. | 332/103 |
| 5,749,051 A | * | 5/1998 | Dent | 455/324 |
| 6,009,129 A | * | 12/1999 | Kenney et al. | 375/346 |
| 6,194,942 B1 | * | 2/2001 | Yu et al. | 327/317 |
| 6,266,517 B1 | * | 7/2001 | Fitzpatrick et al. | 455/114.3 |
| 6,393,011 B1 | * | 5/2002 | Kim | 370/342 |

(Continued)

FOREIGN PATENT DOCUMENTS

FR 2898746 A1 9/2007

(Continued)

OTHER PUBLICATIONS

Faulkner, M., DC Offset and IM2 Removal in Direct Conversion Receivers, Jun. 2002, Communications, IEEE Proceedings, vol. 149, Issue 3, pp. 179-184.*

(Continued)

*Primary Examiner*—Tesfaldet Bocure
*Assistant Examiner*—Lawrence B Williams
(74) *Attorney, Agent, or Firm*—Jiayu Xu

(57) ABSTRACT

Techniques for detecting and mitigating intermodulation distortion (IMD) are described. A device (e.g., a cellular phone) obtains digital intermodulation distortion and digitally determines intermodulation distortion in an input signal based on the digital intermodulation distortion. The device may correlate the digital intermodulation distortion with the input signal and determine intermodulation distortion in the input signal based on correlation results. The device may adjust the operation of one or more circuit blocks (e.g., a mixer, an LNA, etc.) in a receiver based on the detected intermodulation distortion in the input signal. Alternatively or additionally, the device may condition the digital intermodulation distortion to obtain conditioned intermodulation distortion matching intermodulation distortion in the input signal and may then subtract the conditioned intermodulation distortion from the input signal.

38 Claims, 14 Drawing Sheets

U.S. PATENT DOCUMENTS

| | | | |
|---|---|---|---|
| 6,873,832 B2* | 3/2005 | Shi | 455/232.1 |
| 7,046,972 B2* | 5/2006 | Matsuyoshi et al. | 455/114.3 |
| 7,209,528 B2 | 4/2007 | Prater | |
| 7,330,518 B2* | 2/2008 | Kusunoki | 375/297 |
| 7,346,134 B2 | 3/2008 | Smith | |
| 2002/0022951 A1 | 2/2002 | Heijningen et al. | |
| 2002/0187761 A1* | 12/2002 | Im et al. | 455/126 |
| 2002/0187791 A1 | 12/2002 | Ohta et al. | |
| 2003/0021367 A1* | 1/2003 | Smith | 375/346 |
| 2003/0122534 A1* | 7/2003 | Seppinen et al. | 324/76.51 |
| 2004/0048576 A1* | 3/2004 | Hildebrand et al. | 455/67.3 |
| 2007/0104298 A1 | 5/2007 | Filipovic et al. | |
| 2007/0153878 A1 | 7/2007 | Filipovic | |
| 2007/0184782 A1 | 8/2007 | Sahota et al. | |
| 2007/0202812 A1* | 8/2007 | Park et al. | 455/75 |
| 2009/0086863 A1* | 4/2009 | Komninakis et al. | 375/346 |
| 2009/0086864 A1* | 4/2009 | Komninakis et al. | 375/346 |

FOREIGN PATENT DOCUMENTS

| | | |
|---|---|---|
| WO | WO02093807 A1 | 11/2002 |
| WO | WO03009557 A1 | 1/2003 |
| WO | 2004109941 | 12/2004 |
| WO | 2005117417 | 12/2005 |

OTHER PUBLICATIONS

International Search Report. PCT/US07/075337—International Search Authority European Patent Office—Dec. 12, 2007.
Written Opinion, PCT/US07/075337—International Search Authority European Patent Office—Dec. 12, 2007.
Faulkner, DC Offset and IM2 Removal in Direct Conversion Receivers, IEEE, Proc. Common., vol. 149, No. 3, Jun. 2002; pp. 179-184.

\* cited by examiner

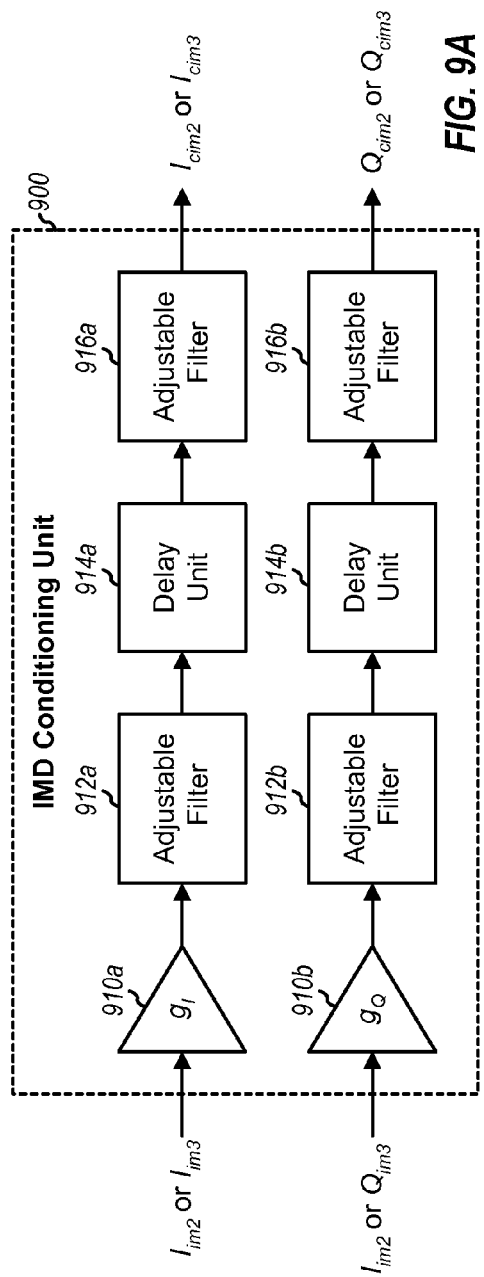
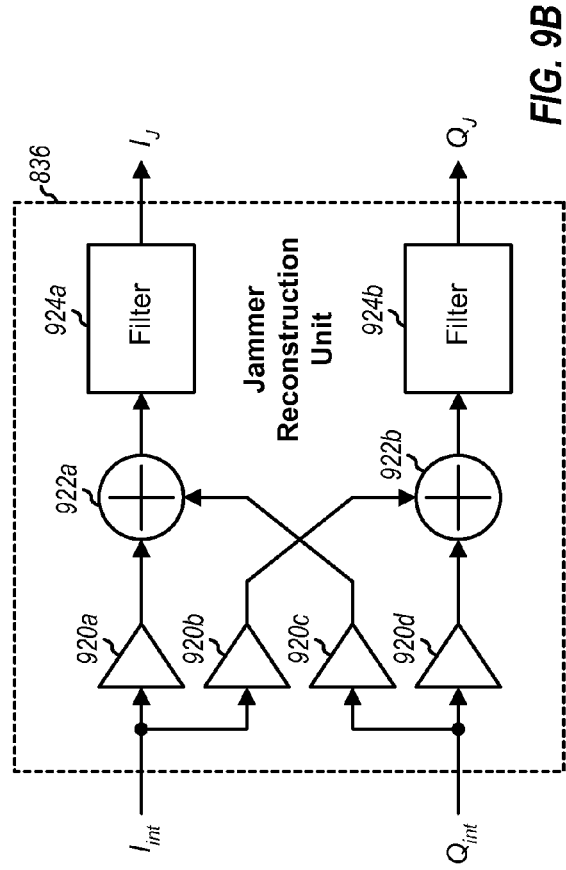

INTERMODULATION DISTORTION DETECTION AND MITIGATION

CLAIM OF PRIORITY UNDER 35 U.S.C. §119

The present Application for Patent claims priority to Provisional Application No. 60/836,608 entitled "Digital Intermodulation Estimation, Digital Intermodulation Cancellation" filed Aug. 8, 2006, and assigned to the assignee hereof and hereby expressly incorporated by reference herein.

BACKGROUND

I. Field

The present disclosure relates generally to circuit, and more specifically to techniques for mitigating intermodulation distortion in a receiver.

II. Background

A wireless device in a wireless full-duplex communication system can simultaneously transmit and receive data for two-way communication. One such full-duplex system is a Code Division Multiple Access (CDMA) system. On the transmit path, a transmitter within the wireless device (a) modulates data onto a radio frequency (RF) carrier signal to generate a modulated signal and (b) amplifies the modulated signal to obtain a transmit signal with the proper signal level. The transmit signal is routed through a duplexer and transmitted via an antenna to one or more base stations. On the receive path, a receiver within the wireless device (a) obtains a received signal via the antenna and duplexer and (b) amplifies, filters, and demodulates the received signal to obtain baseband signals. The baseband signals are further processed to recover data transmitted by the base station(s).

The received signal may include various signal components such as a desired signal and jammers. Jammers are large amplitude undesired signals that are close in frequency to the desired signal. A portion of the transmit signal may also leak from the transmitter via the duplexer to the receiver. Since the transmit signal and the desired signal are typically at two different frequencies, the transmit leakage signal can normally be filtered out and does not pose a problem in itself. However, non-linearity in the receiver may cause mixing of the transmit leakage signal with itself and with the jammers, which may then result in intermodulation distortion that falls within the bandwidth of the desired signal. The intermodulation distortion that falls inband acts as additional noise that may degrade performance There is therefore a need in the art for techniques to mitigate the deleterious effects of intermodulation distortion in a receiver.

SUMMARY

Techniques for detecting and mitigating intermodulation distortion (IMD) are described herein. A device (e.g., a cellular phone) obtains digital representation of intermodulation distortion (or simply, digital intermodulation distortion) and digitally determines or detects for intermodulation distortion in an input signal based on the digital intermodulation distortion. The digital intermodulation distortion may be obtained by (a) generating the intermodulation distortion in the digital domain (as opposed to the analog domain) based on digital data or (b) digitalizing an analog signal containing the intermodulation distortion. Digital determination/detection of intermodulation distortion refers to determination/detection of intermodulation distortion in the digital domain, e.g., using digital signal processing techniques. The device may obtain digital second order intermodulation distortion (IM2) and digitally determine IM2 in the input signal based on the digital IM2. Alternatively or additionally, the device may obtain digital third order intermodulation distortion (IM3) and digitally determine IM3 in the input signal based on the digital IM3. The device may correlate the digital intermodulation distortion with the input signal and may determine intermodulation distortion in the input signal based on correlation results.

The device may adjust the operation of one or more circuit blocks (e.g., a mixer, a low noise amplifier (LNA), etc.) in a receiver based on the determined intermodulation distortion in the input signal. Alternatively or additionally, the device may condition the digital intermodulation distortion to obtain conditioned intermodulation distortion matching intermodulation distortion in the input signal and may then subtract or cancel the conditioned intermodulation distortion from the input signal.

Various aspects and features of the disclosure are described in further detail below.

BRIEF DESCRIPTION OF THE DRAWINGS

FIG. 9A shows an IMD conditioning unit.

FIG. 9B shows a jammer reconstruction unit.

DETAILED DESCRIPTION

The IMD detection and mitigation techniques described herein may be used for a wireless device, a base station, and other electronics devices. A wireless device may also be referred to as a mobile station, a user equipment, a user terminal, a subscriber unit, etc. A wireless device may be a cellular phone, a personal digital assistant (PDA), a wireless modem, a handheld device, a handset, etc. The techniques may also be used for various communication systems such as CDMA systems, Time Division Multiple Access (TDMA) systems, Frequency Division Multiple Access (FDMA) systems, Orthogonal FDMA (OFDMA) systems, etc. For clarity, the techniques are described below for a wireless device in a CDMA system.

Figure 1:
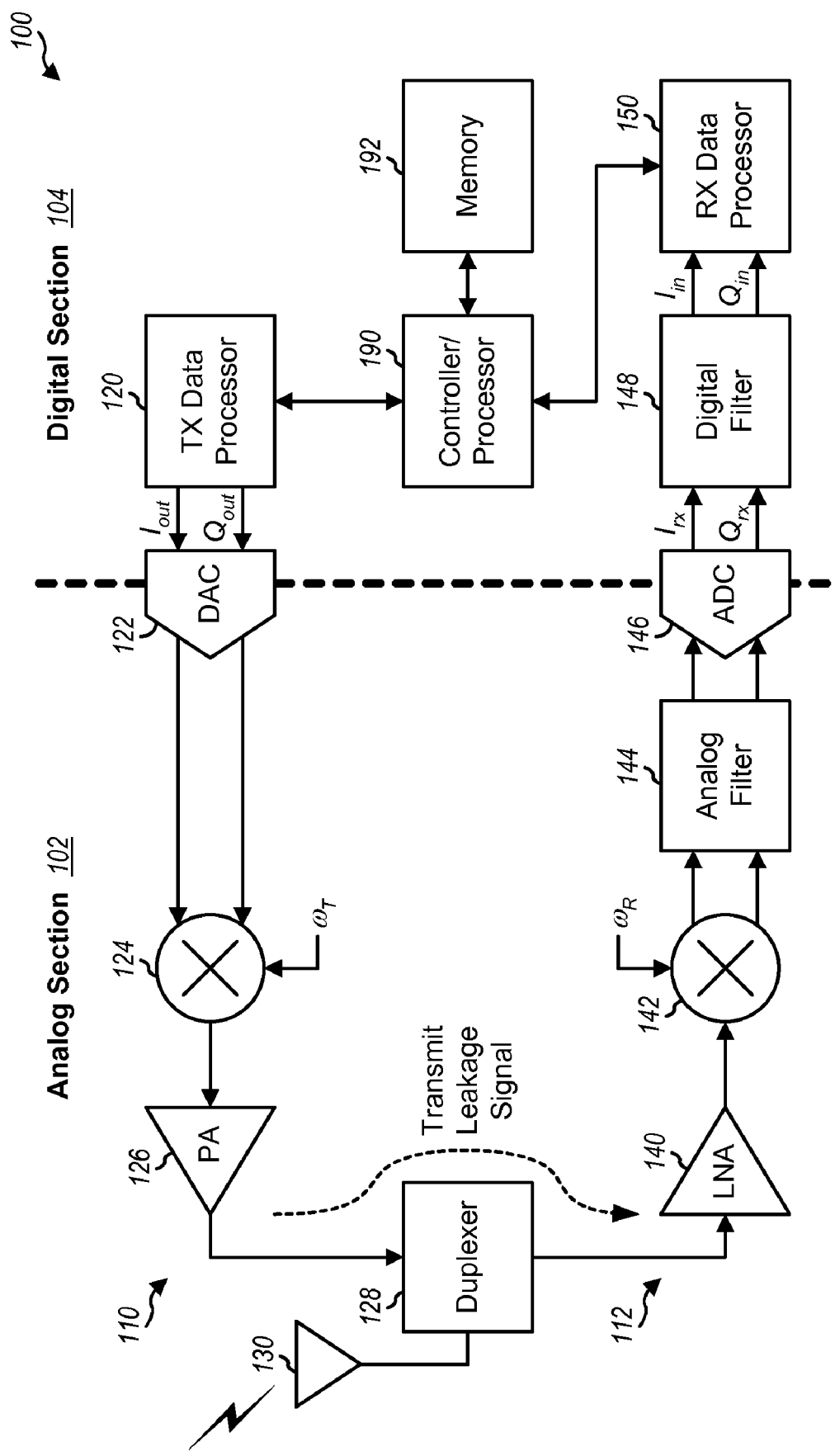
FIG. 1 shows a block diagram of a wireless device.

FIG. 1 shows a block diagram of a wireless device 100 that includes an analog section 102 and a digital section 104. Analog section 102 includes (a) a transmitter 110 comprising a mixer 124 and a power amplifier (PA) 126 and (b) a receiver 112 comprising a low noise amplifier (LNA) 140, a mixer 142, and an analog filter 144.

On the transmit path, a transmit (TX) data processor 120 processes data to be transmitted and provides a digital output inphase (I) signal, $I_{out}$, and a digital output quadrature (Q) signal, $Q_{out}$. A digital-to-analog converter (DAC) 122 converts the output I and Q signals to analog and provides analog I and Q signals. Mixer 124 modulates a transmit local oscillator (LO) signal with the analog I and Q signals and provides a modulated signal. The transmit LO signal is at a frequency of $\omega_T$, which is determined by a frequency channel used for data transmission by wireless device 100. Power amplifier 126 amplifies the modulated signal and provides a transmit signal, which is routed through a duplexer 128 and transmitted via an antenna 130.

On the receive path, antenna 130 receives signals transmitted by base stations and other interfering sources and provides a received signal. Duplexer 128 routes the received signal from antenna 130 to LNA 140. A portion of the transmit signal also leaks via duplexer 128 to LNA 140. The signal at the input of LNA 140 thus includes the received signal from antenna 130 as well as a transmit leakage signal from power amplifier 126. LNA 140 amplifies its input signal and provides an amplified signal. Mixer 142 demodulates the amplified signal with a receive LO signal and provides baseband I and Q signals. The receive LO signal is at a frequency of $\omega_R$, which is determined by a frequency channel being received by wireless device 100. Analog filter 144 filters the baseband I and Q signals to remove noise and other components and provides filtered I and Q signals. Filter 144 may perform anti-alias filtering for the subsequent digitization process. An analog-to-digital converter (ADC) 146 digitizes the filtered I and Q signals and provides digital received I and Q signals, $I_{rx}$ and $Q_{rx}$. A digital filter 148 filters the received I and Q signals and provides digital input I and Q signals, $I_{in}$ and $Q_{in}$. Filter 148 may attenuate noise and other components generated by the digitization process and may pass a desired signal of interest. A receive (RX) data processor 150 processes the input I and Q signals and provides decoded data.

A controller/processor 190 directs operation of various units within wireless device 100. A memory 192 stores data and program codes for wireless device 100.

In general, a receiver may be implemented with a super-heterodyne architecture or a direct-to-baseband architecture. In the super-heterodyne architecture, the received signal is frequency downconverted in multiple stages, e.g., from RF to an intermediate frequency (IF) in one stage, and then from IF to baseband in another stage. In the direct-to-baseband architecture, the received signal is frequency downconverted from RF directly to baseband in one stage, as shown in FIG. 1. The super-heterodyne and direct-to-baseband architectures may use different circuit blocks and/or have different requirements. A transmitter may also be implemented with a super-heterodyne architecture or a direct-from-baseband architecture (as shown in FIG. 1). For clarity, the following description is for the direct-to-baseband architecture.

FIG. 1 shows a simplified transceiver design. In a typical transceiver, the signals in the transmit and receive paths may be conditioned by one or more stages of amplifier, filter, mixer, etc. The circuit blocks may also be arranged differently from the configuration shown in FIG. 1. Furthermore, other circuit blocks not shown in FIG. 1 may also be used to condition the signals in the transmit and receive paths. For example, filters and/or amplifiers may be added before and/or after each mixer.

Figure 2A:
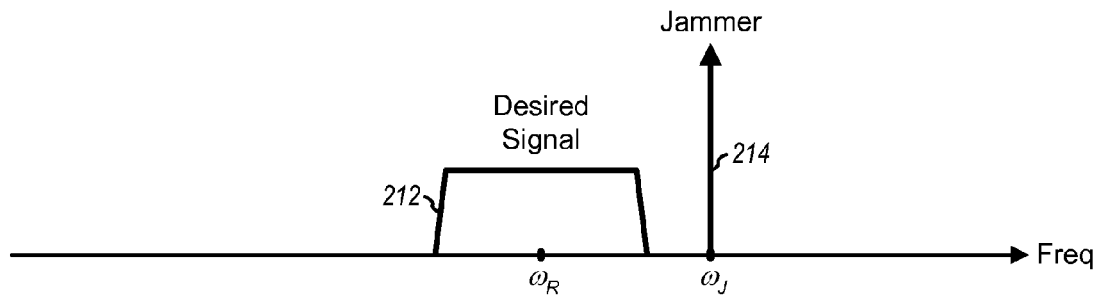
FIGS. 2A to 2D show signal components at various locations of a receiver.

FIG. 2A shows the received signal from antenna 130. The received signal includes a desired signal 212 centered at frequency $\omega_R$ and a jammer 214 at frequency $\omega_J$. Jammer 214 is an undesired signal and may correspond to, for example, a signal transmitted by a nearby base station in an Advanced Mobile Phone Service (AMPS) system. The jammer may have an amplitude that is much higher than that of the desired signal and may be located close in frequency to the desired signal.

Figure 2B:
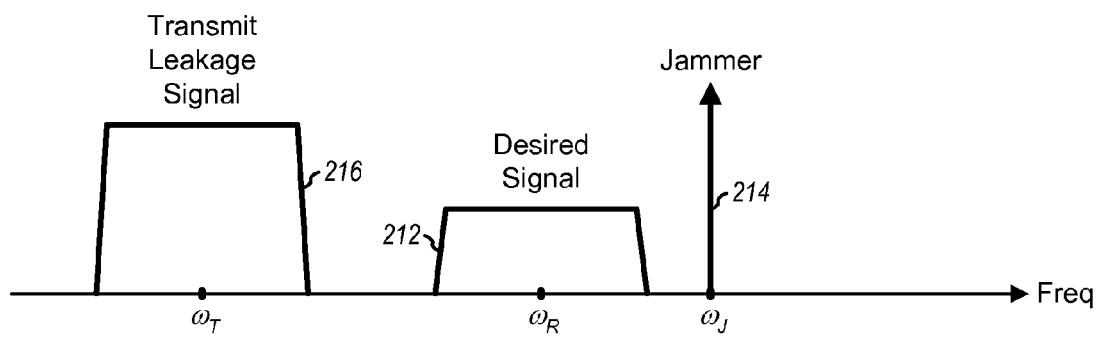

FIG. 2B shows the signal at the input of LNA 140. This signal contains desired signal 212 and jammer 214 in the received signal as well as a transmit leakage signal 216 from the transmitter. The transmit leakage signal may have a large amplitude relative to the desired signal because the transmit signal from power amplifier 126 is typically much larger in amplitude than the desired signal.

Figure 2C:
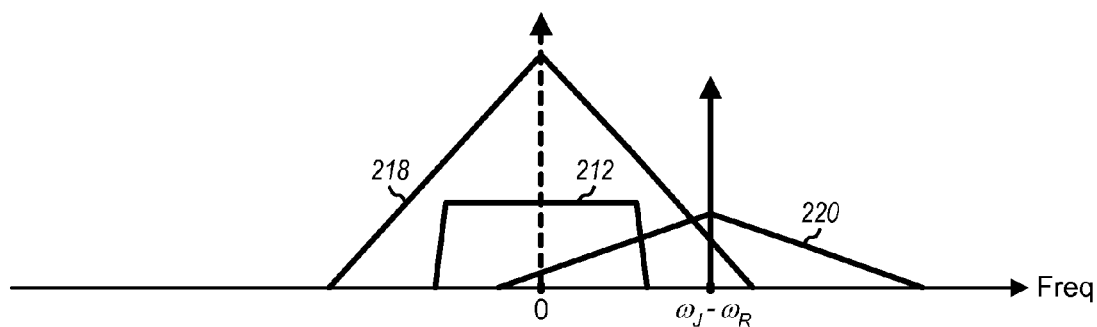

FIG. 2C shows the signal at the output of mixer 142. Non-linearity in LNA 140 and mixer 142 may cause transmit leakage signal 216 to mix with itself, which may then result in a second order intermodulation distortion (IM2) component 218 centered at zero frequency or direct current (DC). The non-linearity may also cause IM2 component 218 to mix with jammer 214, which may then result in a third order intermodulation distortion (IM3) component 220 centered at a downconverted jammer frequency of $\omega_J - \omega_R$. IMD components 218 and 220 are described in further detail below.

Figure 2D:
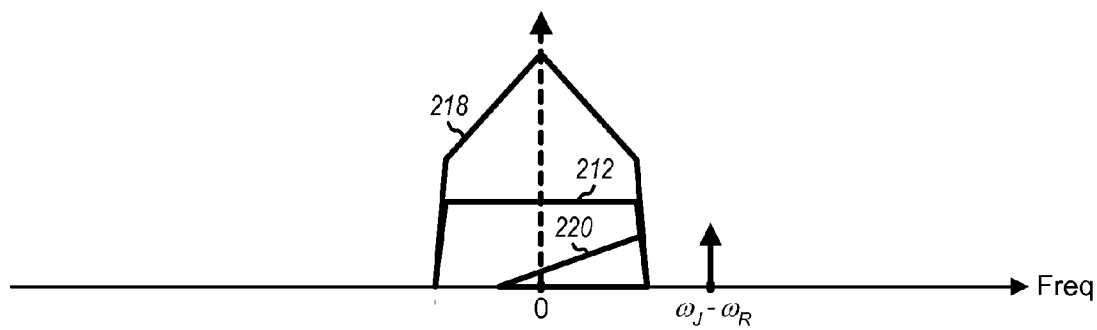

FIG. 2D shows the signal at the output of digital filter 148. Filter 148 may suppress IMD components that are outside of the bandwidth of desired signal 212. IMD components that are within the bandwidth of desired signal 212 are not suppressed and act as additional noise to desired signal 212. This additional noise may degrade performance and result in higher bit error rate (BER), higher packet error rate (PER), etc. The additional noise may also degrade receiver sensitivity (or "desense" the receiver) so that the smallest desired signal that can be reliably detected by the receiver needs to have a larger amplitude.

An active device (e.g., LNA 140 or mixer 142) has the following transfer function:

$$y(v) = \alpha_1 v + \alpha_2 v^2 + \alpha_3 v^3 + \qquad \text{Eq (1)}$$

where v is an input signal into the active device, $\alpha_1, \alpha_2$ and $\alpha_3$ are coefficients that define the linearity of the active device, and y(v) is an output signal from the active device.

For simplicity, higher order terms above third order may be ignored.

In equation (1), $\alpha_1$ v is a linear term, with $\alpha_1$ being the gain of the active device. Second order non-linearity is given by $\alpha_2$ $v^2$, and third order non-linearity is given by $\alpha_3$ $v^3$. Coefficients $\alpha_2$ and $\alpha_3$ determine the amount of second and third order non-linearity, respectively. For an ideal active device, $\alpha_2$ and $\alpha_3$ are equal to zero. A non-ideal device has a non-linear transfer function if $\alpha_2$ and/or $\alpha_3$ have non-zero values.

The input signal into the active device may be given as:

$$v = A[s_x \cos(\omega_T t) - s_y \sin(\omega_T t)] + J\cos(\omega_J t), \qquad \text{Eq (2)}$$

where $A[s_x \cos(\omega_T t) - s_y \sin(\omega_T t)]$ corresponds to the transmit leakage signal, and $J \cos(\omega_J t)$ corresponds to the jammer.

The output signal from the active device may be given as:

$$y(v) = a_1\{A[s_x\cos(\omega_T t) - s_y\sin(\omega_T t)] + J\cos(\omega_J t)\} + \qquad \text{Eq 3}$$
$$\frac{a_2}{2}[A^2(s_x^2 + s_y^2) + J^2] +$$
$$a_2 A J[s_x\cos(\omega_T - \omega_J)t - s_y\sin(\omega_T - \omega_J)t] +$$

$$\frac{3a_3}{4}[A^2(s_x^2+s_y^2)+2J^2]A[s_x\cos(\omega_T t)-s_y\sin(\omega_T t)]+$$

$$\frac{3a_3}{4}[2A^2(s_x^2+s_y^2)+J^2]J\cos(\omega_J t)+$$

$$\frac{3a_3}{2}A^2J[(s_x^2-s_y^2)\cos(2\omega_T-\omega_J)t-s_xs_y\sin(2\omega_T-\omega_J)t]+$$

$$\frac{3a_3}{2}AJ^2[s_x\cos(2\omega_J-\omega_T)t-s_y\sin(2\omega_J-\omega_T)t].$$

In equation (3), the first row includes two components from the linear term $\alpha_1$ v. The transmit leakage signal and jammer are passed by the linear term and may be downconverted by mixer 142 and filtered by analog filter 144 and/or digital filter 148. The second row includes two IM2 components generated by the second order non-linearity term $\alpha_2$ $v^2$. These IM2 components are at DC and $\omega_T-\omega_J$. The third through last row include IM3 components generated by the third order non-linearity term $\alpha_3$ $v^3$. These IM3 components are at frequencies $\omega_T$, $\omega_J$, $2\omega_T-\omega_J$, and $2\omega_J-\omega_T$.

As shown in equation (3), second order and third order non-linearity generates various combinations of mixing products. Two mixing products are of particular interest and may be expressed as:

$$y(v)= \qquad \text{Eq (4)}$$
$$\frac{a_2}{2}[A^2(s_x^2+s_y^2)+J^2]+\frac{3a_3}{4}[2A^2(s_x^2+s_y^2)+J^2]J\cos(\omega_J t)+\ldots$$

In equation (4), $\alpha_2[A^2(s_x^2+s_y^2)+J^2]/2$ is an IM2 component resulting from second order non-linearity. $3\alpha_3[2A^2(s_x^2+s_y^2)+J^2]J \cos (\omega_J t)/4$ is an IM3 component resulting from third order non-linearity. The other IM2 and IM3 components in the first, third, fifth, and sixth lines of equation (3) are downconverted to other frequencies by mixer 142 and may be filtered out.

FIG. 2C shows IM2 and IM3 components generated by second and third order non-linearity of LNA 140 and/or mixer 142. At the output of mixer 142, desired signal 212 is downconverted to DC. The IM2 component $\alpha_2[A^2(s_x^2+s_y^2)+J^2]/2$ is passed through mixer 142 and falls on top of the desired signal at DC. This IM2 component is essentially the square of the transmit signal. Squaring of the transmit signal in the time domain corresponds to convolution of the transmit signal with itself in the frequency domain. If the transmit signal has a rectangular spectral shape, then the convolution results in IM2 component 218 having an approximately triangle shape. The IM3 component $3\alpha_3[2A^2(s_x^2+s_y^2)+J^2]J \cos(\omega_J t)/4$ is centered at the downconverted jammer frequency and may overlap the desired signal. This IM3 component is essentially the square of the transmit signal mixed with the jammer and corresponds to IM3 component 220 having an approximately triangle shape centered at the downconverted jammer frequency.

Receiver 112 may have poor second order and/or third order non-linearity. The non-linearity may cause IMD components that fall inband when the transmit leakage signal and/or jammers are present, as shown in equation (3) and FIG. 2C. The IMD components may degrade performance and/or desense the receiver.

Figure 3:
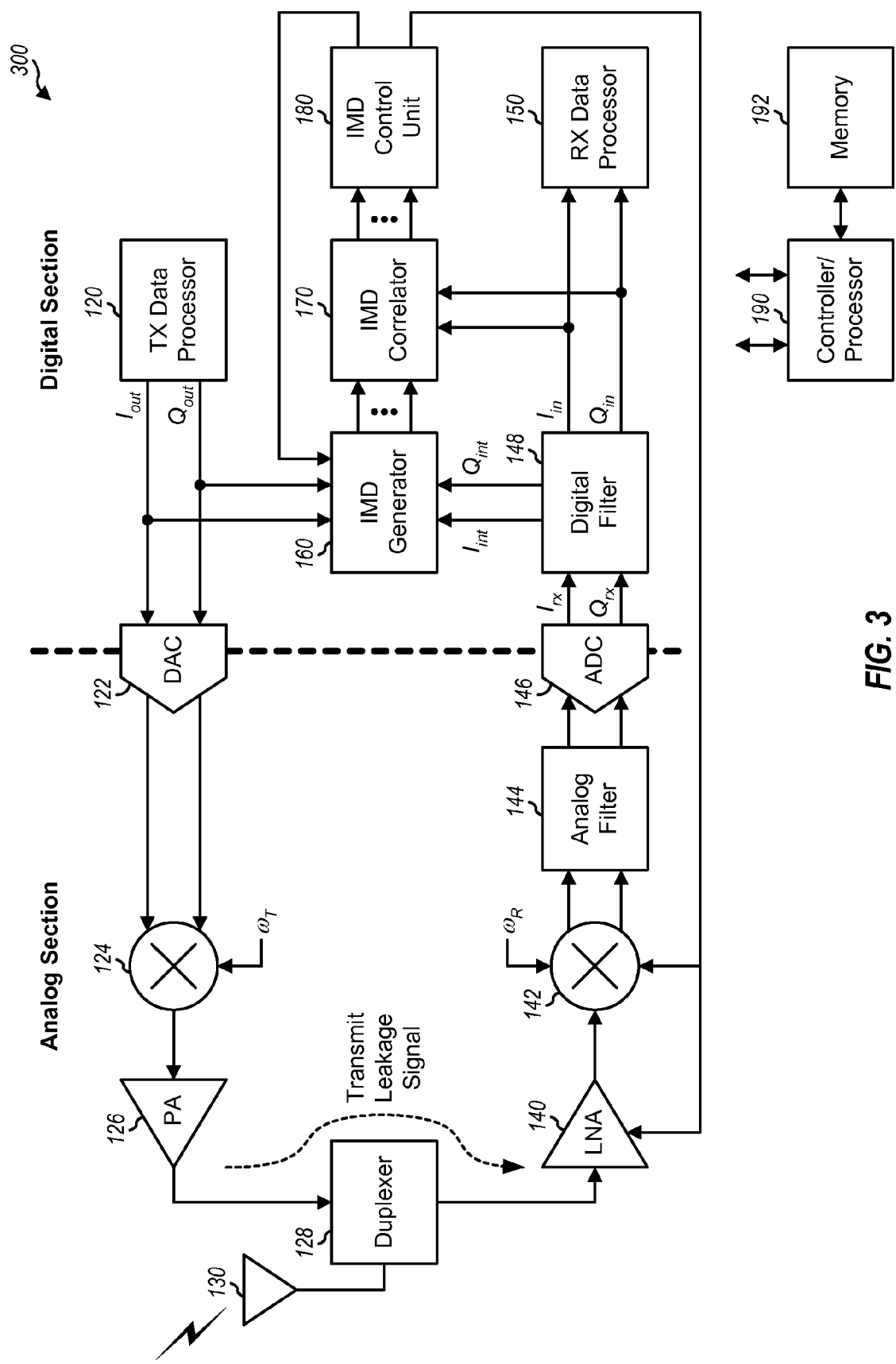
FIG. 3 shows a wireless device with digital IMD generation and detection based on a version of a transmit signal prior to digital-to-analog conversion.

In an aspect, IM2 and/or IM3 in an input signal are detected by obtaining digital IM2 and/or IM3 and correlating the input signal with the digital IM2 and/or IM3. Corrective actions may be taken to reduce the detected IM2 and/or IM3 levels to within acceptable levels. The IM2 and IM3 components of interest are due to mixing products of the transmit signal. IM2 and/or IM3 may be digitally generated based on a version of the transmit signal, which may be obtained from the digital signals provided to DAC 122 or from downconverting the transmit signal. Digital IM2 may also be obtained by digitalizing a squared version of the transmit signal, FIG. 3 shows a block diagram of a design of a wireless device 300 with digital IMD generation and detection based on the digital output I and Q signals, $I_{out}$ and $Q_{out}$. Wireless device 300 includes units 120 through 150, 190 and 192 within wireless device 100 in FIG. 1. Wireless device 300 further includes an IMD generator 160, an IMD correlator 170, and an IMD control unit 180.

IMD generator 160 receives the digital output I and Q signals, $I_{out\,and\,Qout}$, from TX data processor 120 and may also receive intermediate I and Q signals, $I_{int}$ and $Q_{int}$, from digital filter 148. IMD generator 160 digitally generates IMD due to the transmit signal, as described below. IMD correlator 170 receives the digital IMD and the input I and Q signals, $I_{in}$ and $Q_{in}$, from digital filter 148. IMD correlator 170 correlates the input I and Q signals with the digital IMD and provides correlation results. IMD control unit 180 determines the levels of IMD in the input I and Q signals based on the correlation results. IMD control unit 180 generates one or more controls to adjust one or more circuit blocks based on the detected IMD levels such that IMD in the input I and Q signals is reduced.

Wireless device 300 generates IMD based on a digital version of the transmit signal. This may simplify the design of wireless device 300 and reduce cost since the processing to generate IMD may be performed digitally without using extra analog circuitry.

Figure 4A:
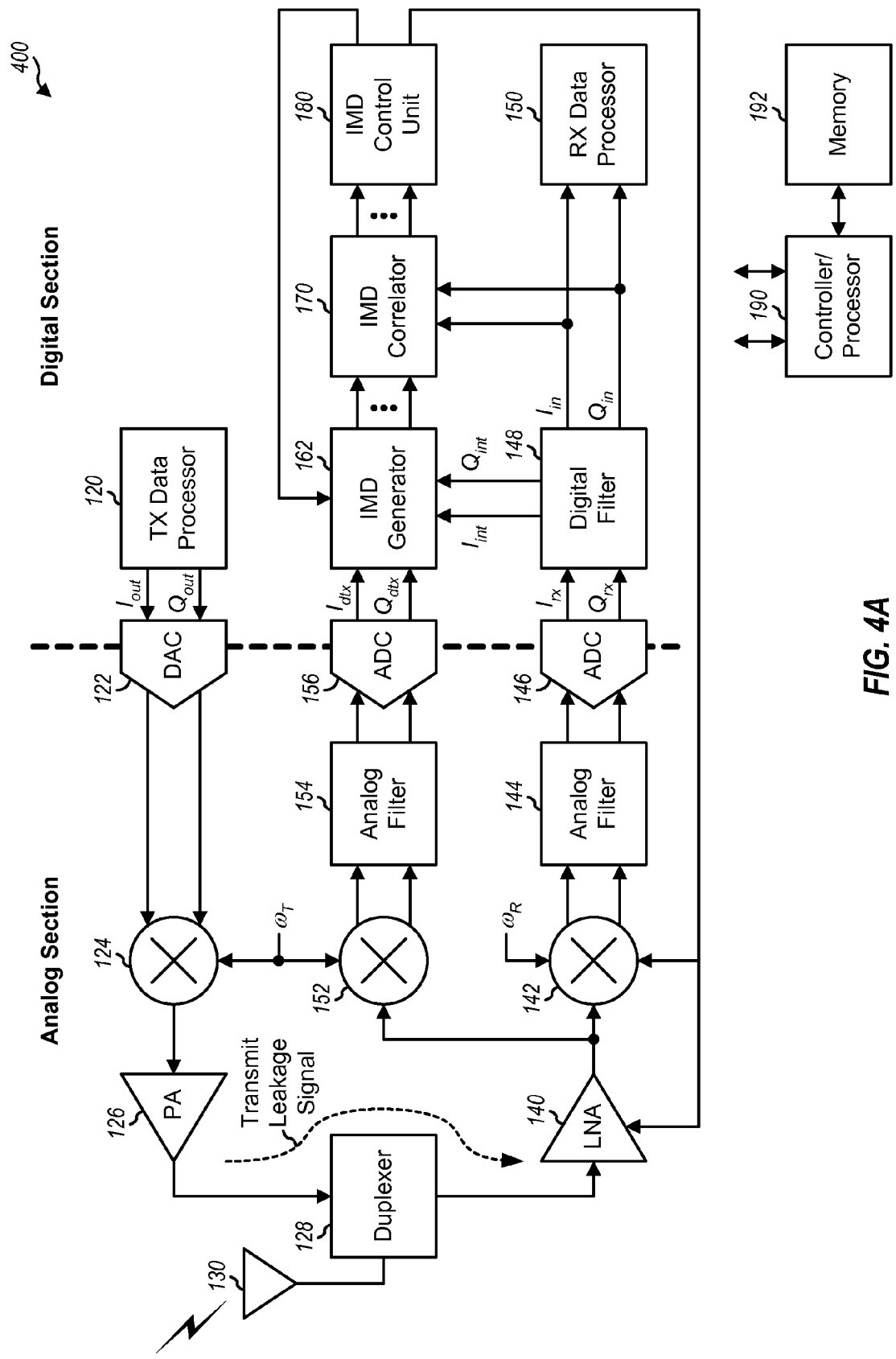
FIG. 4A shows a wireless device with digital IMD generation and detection based on a downconverted version of the transmit signal.

FIG. 4A shows a block diagram of a design of a wireless device 400 with digital IMD generation and detection based on a downconverted version of the transmit signal. Wireless device 400 includes units 120 through 150, 190 and 192 within wireless device 100 in FIG. 1. Wireless device 400 further includes a second receive path for the transmit signal, an IMD generator 162, IMD detector 170, and IMD control unit 180.

For the second receive path, a mixer 152 demodulates the amplified signal from LNA 140 with the transmit LO signal and provides baseband I and Q signals. The same transmit LO signal is provided to both mixer 124 in the transmit path and mixer 152 in the second receive path. An analog filter 154 filters the baseband I and Q signals to remove noise and other components and provides filtered I and Q signals. An ADC 156 digitizes the filtered I and Q signals and provides digital downconverted I and Q signals, $I_{dtx}$ and $Q_{dtx}$, to IMD generator 162.

IMD generator 162 receives the downconverted I and Q signals from ADC 156 and may also receive the intermediate I and Q signals, $I_{int}$ and $Q_{int}$, from digital filter 148. IMD generator 162 digitally generates IMD due to the transmit signal. IMD correlator 170 receives the digital IMD and the input I and Q signals, $I_{in}$ and $Q_{in}$, from digital filter 148, correlates the input I and Q signals with the generated IMD, and provides correlation results. IMD control unit 180 determines the levels of IMD in the input I and Q signals based on the correlation results and generates one or more controls for one or more circuit blocks to reduce the detected IMD levels.

Wireless device 400 generates IMD based on a downconverted version of the transmit signal. The transmit signal version provided to IMD generator 162 experiences or goes through the same transmit circuitry as the transmit signal that actually gave rise to the IMD in the input I and Q signals. This same transmit circuitry includes duplexer 128 whose behavior (e.g., delay and gain characteristics) is often unpredictable in the stopband. Mixer 152, analog filter 154, and ADC 156 are used simply for demodulation of the transmit signal and hence do not necessarily have to be matched to mixer 142, analog filter 144, and ADC 146, respectively. The transmit signal version used for IMD generation would then observe similar receive circuitry as the transmit signal that caused the received IMD in the input I and Q signals. Matching the transmit signal version provided to IMD generator 162 to the transmit signal that caused the received IMD may result in greater accuracy in IMD generation.

Figure 4B:
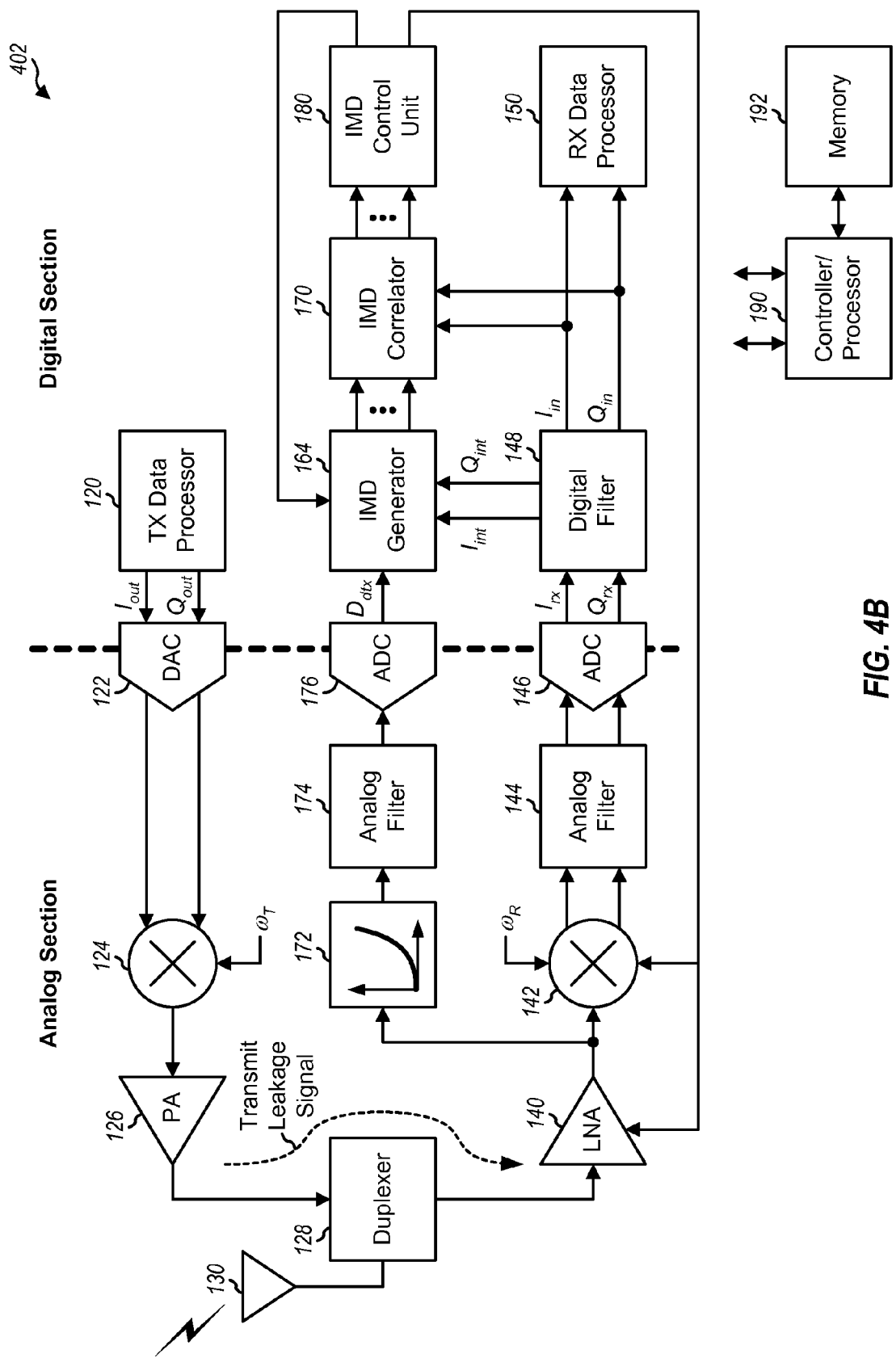
FIG. 4B shows a wireless device with digital IMD detection based on a squared version of the transmit signal.

FIG. 4B shows a block diagram of a design of a wireless device 402 with digital IMD generation and detection based on a squared version of the transmit signal. Wireless device 402 includes units 120 through 150, 190 and 192 within wireless device 100 in FIG. 1. Wireless device 402 further includes a second receive path for the transmit signal, an IMD generator 164, IMD detector 170, and IMD control unit 180.

For the second receive path, a square-law device 172 receives the amplified signal from LNA 140, applies a non-linear transfer function to the amplified signal, and provides an output signal containing a squared-in-RF component. The non-linear transfer function is used to downconvert the transmit signal component to baseband and may be a square function, an exponential function, etc. An analog filter 174 filters the output signal from device 172 to remove noise and other components and provides a filtered signal. An ADC 176 digitizes the filtered signal and provides digital downconverted signal, $D_{dtx}$, to IMD generator 164.

Digital filter 148 in FIGS. 3, 4A and 4B may include multiple filter stages. A first filter stage may have a relatively wide bandwidth and may attenuate images and quantization noise from the digitization by ADC 146. For example, if ADC 146 is a sigma-delta ADC with noise shaping, then the first filter stage may attenuate high frequency quantization noise from the ADC. A second filter stage may have a narrow bandwidth that passes the desired signal and attenuates jammers. The second filter stage may perform channel selection, jammer rejection, noise filtering, down sampling, etc.

Figure 5A:
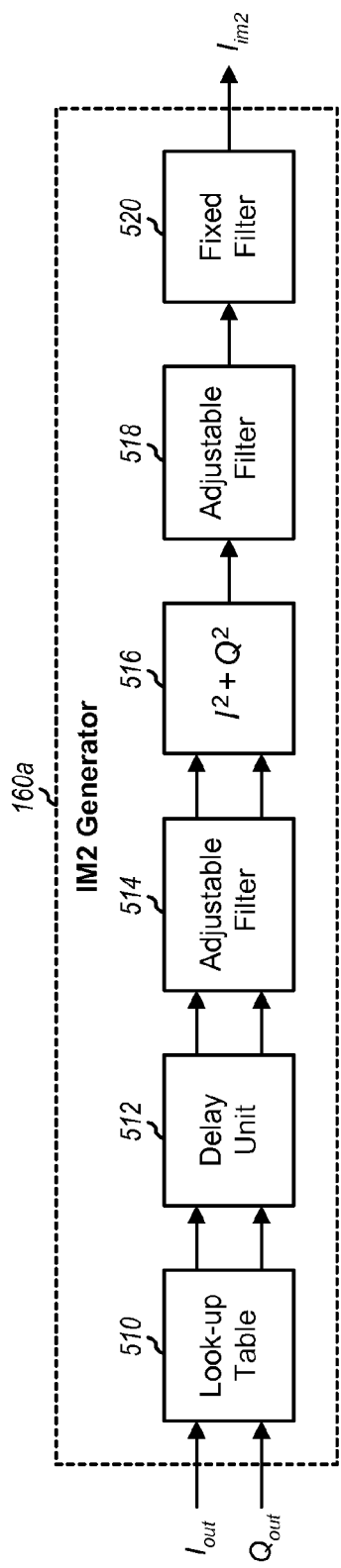
FIGS. 5A to 5E show different designs of IM2 and IM3 generators.

FIG. 5A shows a block diagram of a design of an IM2 generator 160a that digitally generates IM2 based on the output I and Q signals, $I_{out}$ and $Q_{out}$, from TX data processor 120. IM2 generator 160a may be used for IMD generator 160 in FIG. 3. Within IM2 generator 160a, a look-up table (LUT) 510 receives the output I and Q signals and provides compensated I and Q signals. Look-up table 510 may account for characteristics of various circuit blocks in the transmit path, e.g., power amplifier 126, mixer 124, etc. A delay unit 512 delays the I and Q outputs of look-up table 510 by a variable amount of delay. An adjustable filter 514 filters the I and Q outputs of delay unit 512 with a first filter response. A unit 516 computes the square magnitude of the I and Q outputs from filter 514. An adjustable filter 518 filters the output of unit 516 with a second filter response. Filter 514 may account for the frequency responses of circuit blocks observed by the transmit leakage signal from DAC 122 to mixer 142. Filter 518 may account for the frequency responses of circuit blocks observed by the transmit leakage signal after mixer 142. A fixed filter 520 filters the output of filter 518 to remove noise and out-of-band components and provides digital IM2, $I_{im2}$.

IM2 generator 160a digitally generates IM2 due to the transmit signal leaking through duplexer 128 into the receive path. The generated IM2 should match the received IM2, which is IM2 in the input I and Q signals from digital filter 148. IM2 generator 160a includes various units that may be adjusted to match the generated IM2 to the received IM2. Delay unit 512 may be used to time align the generated IM2 with the received IM2. Filters 514 and 518 may be used to match the frequency response of the generated IM2 with the frequency response of the received IM2.

Filters 514 and 518 may each be implemented with a 2-tap finite impulse response (FIR) filter having the following filter response:

$$z(n)=x(n)+c \cdot x(n-1), \qquad \text{Eq (5)}$$

where $x(n)$ is an input signal into the filter for sample period n, $z(n)$ is an output signal from the filter for sample period n, and c is a filter coefficient.

Coefficient $c_1$ may be used for filter 514, and coefficient $c_2$ may be used for filter 518. Coefficients $c_1$ and $c_2$ may be selected such that the generated IM2 has a frequency response (e.g., a roll-off or droop) that matches the frequency response of the received IM2. Filters 514 and 518 may also be implemented with higher order FIR filters, infinite impulse response (IIR) filters, or filters of other types.

Figure 5B:
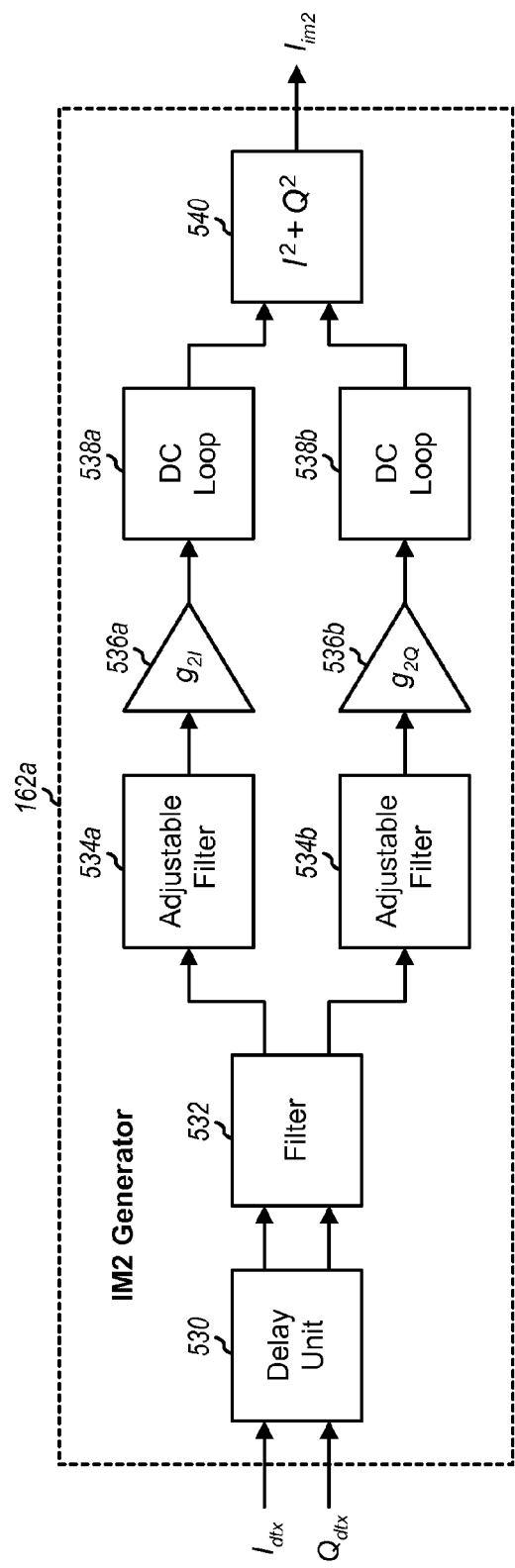

FIG. 5B shows a block diagram of a design of an IM2 generator 162a that digitally generates IM2 based on the downconverted I and Q signals, $I_{dtx}$ and $Q_{dtx}$, from ADC 156 in FIG. 4A. IM2 generator 162a may be used for IMD generator 162 in FIG. 4A. Within IM2 generator 162a, a delay unit 530 delays the downconverted I and Q signals by a variable amount of delay. A filter 532 filters the I and Q outputs of delay unit 530 to remove noise and other components generated by digitization. Adjustable filters 534a and 534b filter the I and Q outputs of filter 532 with filter responses that may be adjusted separately for I and Q. Gain units 536a and 536b scale the outputs of filters 534a and 534b, respectively, with gains $g_{2I}$ and $g_{2Q}$ that may be selected separately for I and Q. Filters 534a and 534b and gain units 536a and 536b may be used to compute a weighted $I^2+Q^2$ which may be used to match amplitude imbalance in the I and Q paths. The downconverted I and Q signals, $I_{dtx}$ and $Q_{dtx}$, may have DC offset due to circuit blocks such as ADC 156, etc. DC loops 538a and 538b attempt to remove the DC offset in the outputs of gain units 536a and 536b, respectively. DC loops 538a and 538b may also be placed at other locations, e.g., after filter 532, or after filters 534a and 534b, etc. A unit 540 computes the square magnitude of the I and Q outputs of DC loops 538a and 538b and provides digital IM2, $I_{im2}$. Although not shown in FIG. 5B, a DC loop may be added after unit 540 and used to remove DC component from the digital IM2.

Figure 5C:
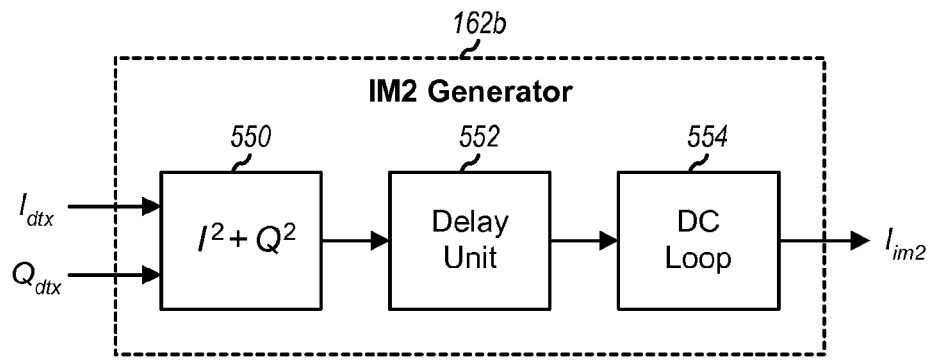

FIG. 5C shows a block diagram of a design of an IM2 generator 162b that digitally generates IM2 based on the downconverted I and Q signals, $I_{dtx}$ and $Q_{dtx}$, from ADC 156 in FIG. 4A. IM2 generator 162b may also be used for IMD generator 162 in FIG. 4A. Within IM2 generator 162b, a unit 550 computes the square magnitude of the downconverted I and Q signals. A delay unit 552 delays the output of unit 550 by a variable amount of delay. A DC loop 554 removes DC offset in the output of delay unit 552 and provides digital IM2, $I_{im2}$. Since the downconverted I and Q signals observe the same transmit circuitry and similar receive circuitry as the IMD in the input I and Q signals, the frequency response of the generated IM2 may closely match the frequency response of the received IM2. Filtering may thus be omitted in IM2 generator 162b.

Figure 5D:
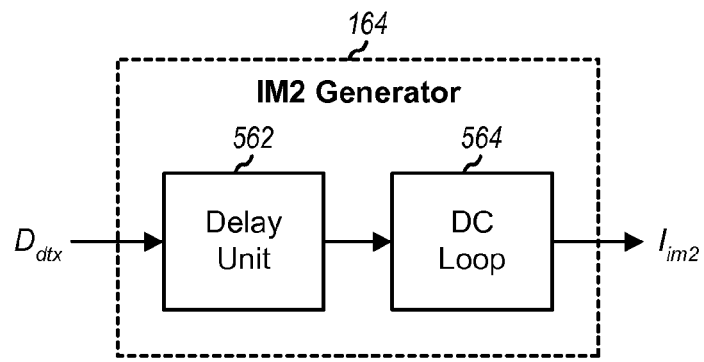

FIG. 5D shows a block diagram of a design of IM2 generator 164 in FIG. 4B. IM2 generator 164 receives the digital downconverted signal, $D_{dtx}$, and provides digital IM2, $I_{im2}$. The actual generation of IM2 is performed by square-law device 172, and IM2 generator 164 simply provides digital representation of the IM2. Within IM2 generator 164, a delay unit 562 delays the digital downconverted signal, $D_{dtx}$, from ADC 176 by a variable amount of delay. A DC loop 564 removes DC offset in the output of delay unit 562 and provides the digital IM2, $I_{im2}$.

FIGS. 5A through 5D show four specific IM2 generator designs. IM2 may also be generated in other manners, e.g., with other configurations and/or other units. For example, in FIG. 5A, filters 514 and 518 may be combined into one filter, delay unit 512 may be moved after unit 516, etc. As another example, in FIG. 5C, a filter may be provided, e.g., before or after delay unit 552. In general, IM2 may be generated with variable gain, variable delay, adjustable frequency response, DC offset removal, etc., or any combination thereof.

Figure 5E:
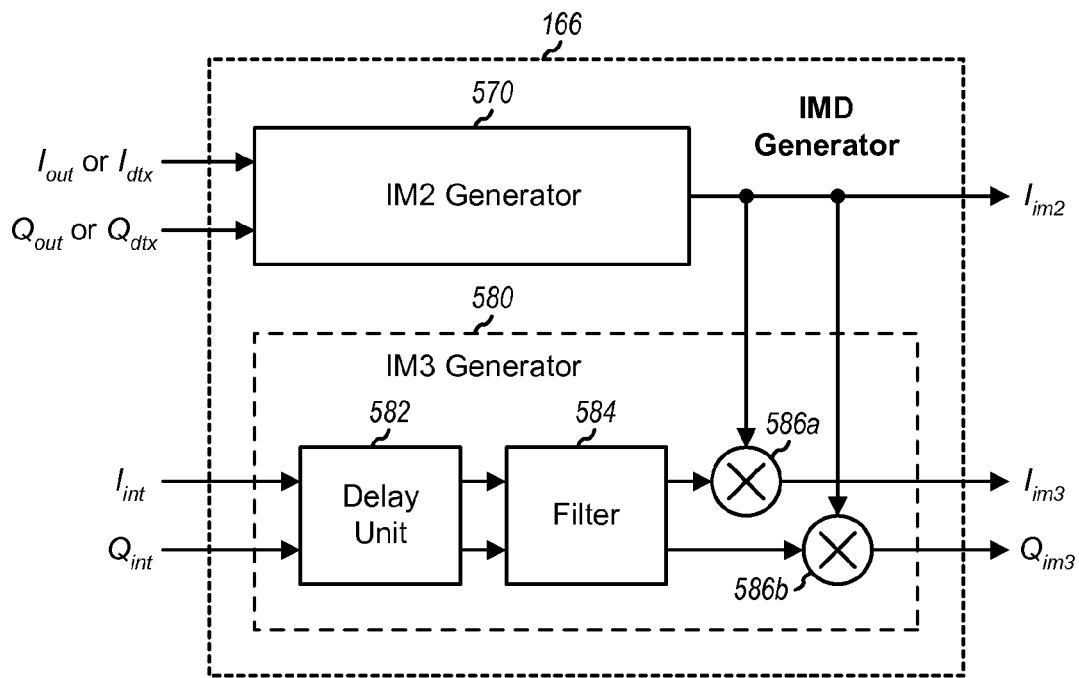

FIG. 5E shows a block diagram of a design of an IMD generator 166 that digitally generates IM2 and IM3 based on a version of the transmit signal. IMD generator 166 may be used for IMD generator 160 in FIG. 3, IMD generator 162 in FIG. 4A, and IMD generator 164 in FIG. 4B.

IMD generator 166 includes an IM2 generator 570 and an IM3 generator 580. IM2 generator 570 receives (a) the output I and Q signals, $I_{out}$ and $Q_{out}$, from TX data processor 120 in FIG. 3, or (b) the downconverted I and Q signals, $I_{dtx}$ and $Q_{dtx}$, from ADC 156 in FIG. 4A, or (c) the downconverted signal, $D_{dtx}$, from ADC 176 in FIG. 4B. IM2 generator 570 digitally generates IM2 based on the inputs and provides digital IM2, $I_{im2}$. IM2 generator 570 may be implemented with IM2 generator 160a in FIG. 5A, IM2 generator 162a in FIG. 5B, IM2 generator 162b in FIG. 5C, IM2 generator 164 in FIG. 5D, or some other design. IM3 generator 580 receives the intermediate I and Q signals, $I_{int}$ and $Q_{int}$, from the first filter stage (with jammers unattenuated or attenuated little) and the generated IM2 from IM2 generator 570 and digitally generates IM3. Within IM3 generator 580, a delay unit 582 delays the intermediate I and Q signals such that the jammers in these signals are time aligned with the generated IM2 from IM2 generator 570. A filter (e.g., an equalizer) 584 may follow (or precede) delay unit 582 and may restore the jammer signal included in the intermediate I and Q signals. Multipliers 586a and 586b multiply the generated IM2 with the delayed and filtered (e.g., equalized) I and Q signals containing the jammer, respectively, from filter 584 and provide digital IM3, $I_{im3}$ and $Q_{im3}$.

FIG. 5E shows a specific IM3 generator design. IM3 may also be generated in other manners, e.g., with other configurations and/or other units. For example, delay unit 582 may delay the generated IM2 instead of the intermediate I and Q signals. As another example, a filter may be added before or after delay unit 582, after multipliers 584a and 584b, etc. In general, IM3 may be generated with variable gain, variable delay, adjustable frequency response, or any combination thereof.

Figure 6A:
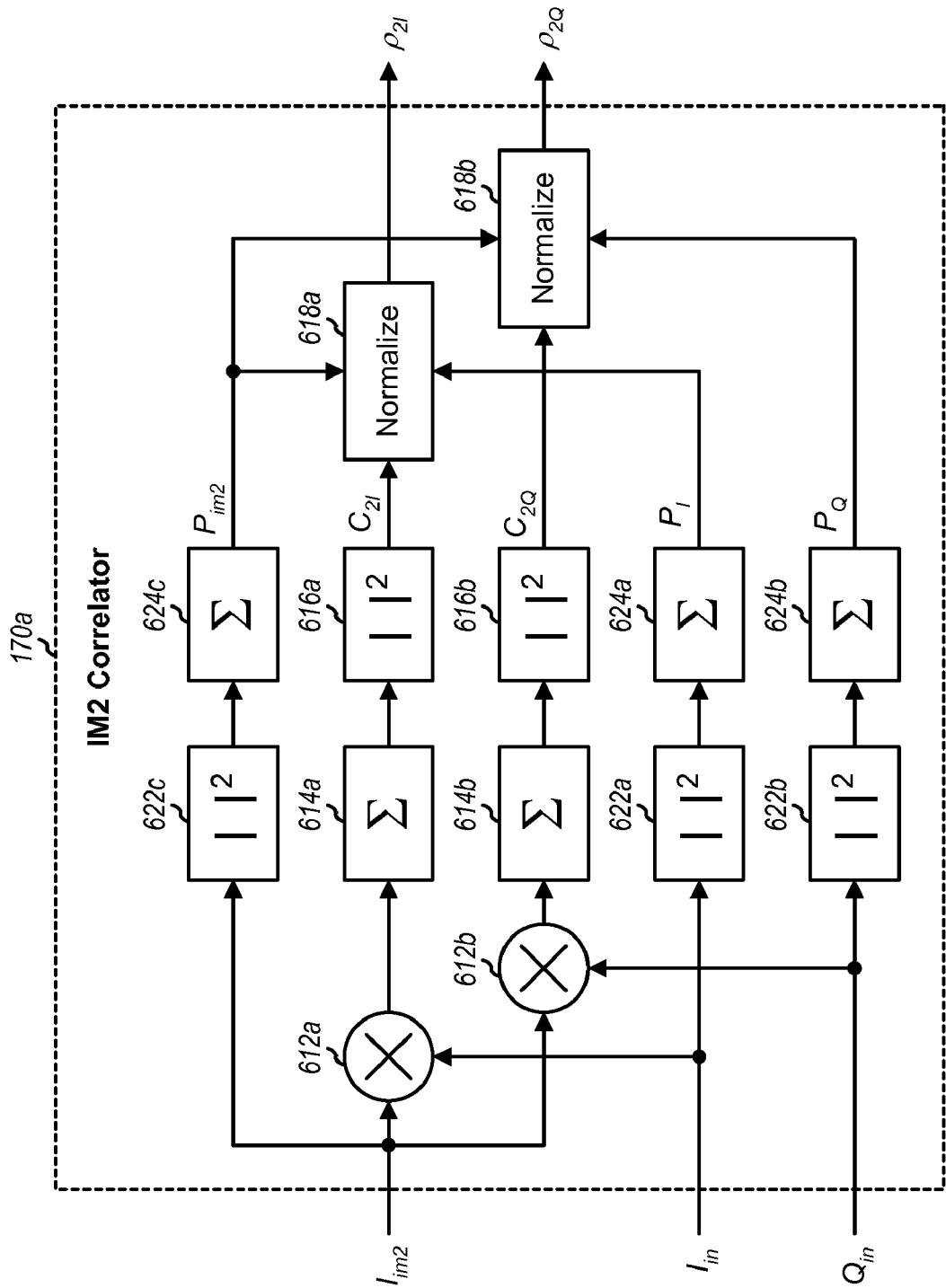
FIGS. 6A to 6C show different designs of IM2 and IM3 correlators.

FIG. 6A shows a block diagram of a design of an IM2 correlator 170a that digitally detects for IM2 in the input I and Q signals. IM2 correlator 170a may be used for IMD correlator 170 in FIGS. 3, 4A and 4B. Within IM2 correlator 170a, a multiplier 612a multiplies the input I signal, $I_{in}$, from digital filter 148 with the generated IM2, $I_{im2}$. A multiplier 612b multiplies the input Q signal, $Q_{in}$, from digital filter 148 with the generated IM2. Accumulators 614a and 614b accumulate the outputs of multipliers 612a and 612b, respectively. A unit 616a computes the square magnitude of the output of accumulator 614a and provides correlated IM2 I power, $C_{2I}$. A unit 616b computes the square magnitude of the output of accumulator 614b and provides correlated IM2 Q power, $C_{2Q}$. $C_{2I}$ and $C_{2Q}$ are indicative of the amount of correlation between the generated IM2 and the received IM2.

Units 622a and 622b compute the square magnitude of the input I and Q signals, respectively. An accumulator 624a accumulates the output of unit 622a and provides the input I signal power, $P_I$. An accumulator 624b accumulates the output of unit 622b and provides the input Q signal power, $P_Q$. A unit 622c computes the square magnitude of the generated IM2. An accumulator 624c accumulates the output of unit 622c provides the generated IM2 power, $P_{im2}$.

A unit 618a normalizes the correlated IM2 I power, $C_{2I}$, based on the powers $P_I$ and $P_{im2}$ and provides a correlation result $\rho_{2I}$ for the I signal. A unit 618b normalizes the correlated IM2 Q power, $C_{2Q}$, based on the powers $P_Q$ and $P_{im2}$ and provides a correlation result $\rho_{2Q}$ for the Q signal. The correlation results for IM2 may be expressed as:

$$\rho_{2I} = \frac{1}{P_I P_{im2}} \cdot \left| \sum_n I_{im2}(n) I_{in}(n) \right|^2, \text{ and} \qquad \text{Eq (6)}$$

$$\rho_{2Q} = \frac{1}{P_Q P_{im2}} \cdot \left| \sum_n I_{im2}(n) Q_{in}(n) \right|^2,$$

where $I_{in}(n)$ and $Q_{in}(n)$ are the input I and Q signals for sample period n, and $I_{im2}(n)$ is the generated IM2 for sample period n.

Figure 6B:
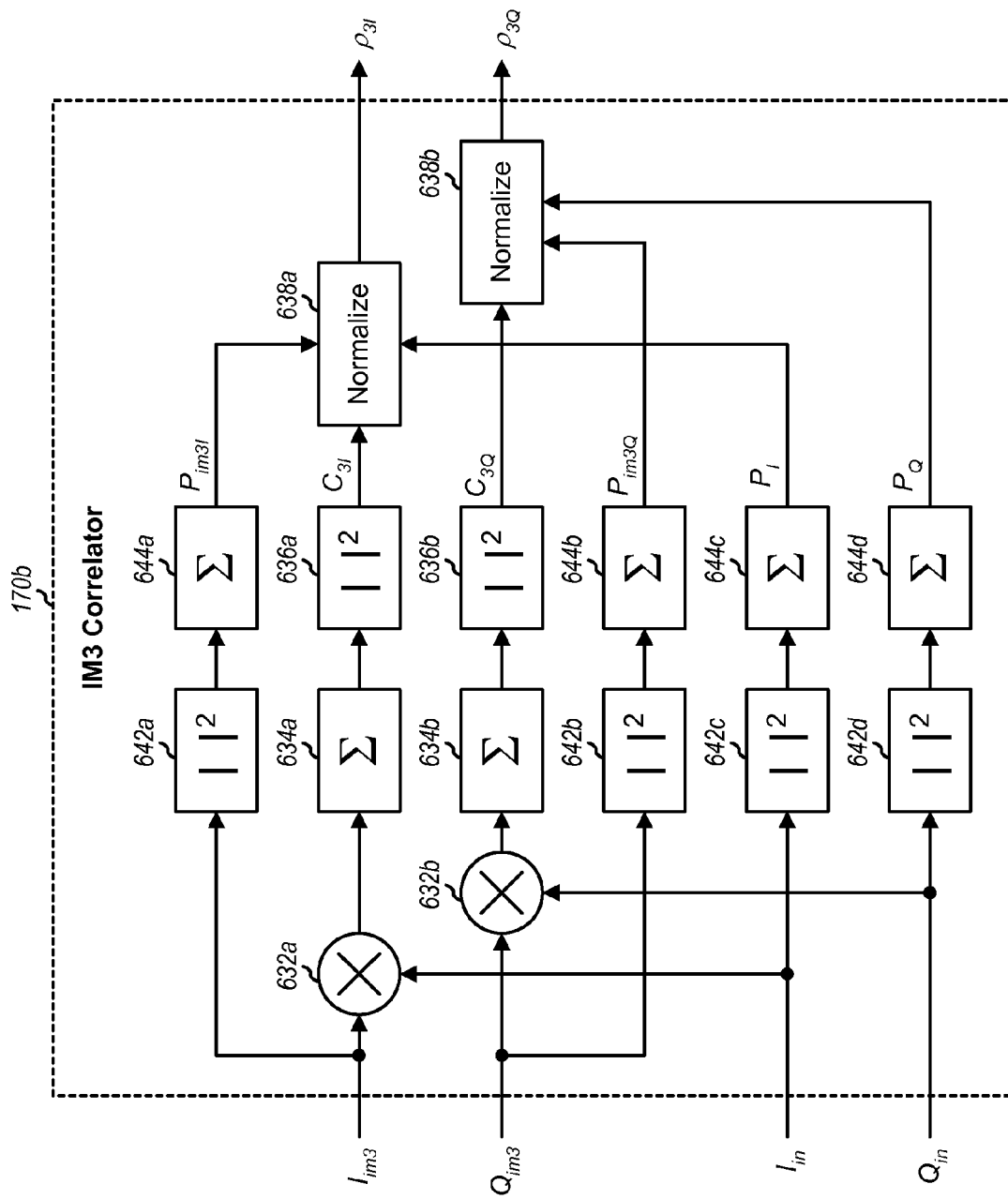

FIG. 6B shows a block diagram of a design of an IM3 correlator 170b that digitally detects for IM3 in the input I and Q signals. IM3 correlator 170b may be used for IMD correlator 170 in FIGS. 3, 4A and 4B. Within IM3 correlator 170b, a multiplier 632a multiplies the input I signal, $I_{in}$, with the generated IM3 Q component, $I_{im3}$. A multiplier 632b multiplies the input Q signal, $Q_{in}$, with the generated IM3 Q component, $Q_{im3}$. Accumulators 634a and 634b accumulate the outputs of multipliers 632a and 632b, respectively. A unit 636a computes the square magnitude of the output of accumulator 634a and provides correlated IM3 I power, $C_{3I}$. A unit 636b computes the square magnitude of the output of accumulator 634b and provides correlated IM3 Q power, $C_{3Q}$. $C_{3I}$ and $C_{3Q}$ are indicative of the amount of correlation between the generated IM3 and the received IM3. Units 642a and 642b compute the square magnitude of the generated IM3 I and Q components, respectively. An accumulator 644a accumulates the output of unit 642a and provides the generated IM3 I power, $P_{im3I}$. An accumulator 644b accumulates the output of unit 642b and provides the generated IM3 Q power, $P_{im3Q}$. Units 642c and 642d compute the square magnitude of the input I and Q signals, respectively. An accumulator 644c accumulates the output of unit 642c and provides the input I signal power, $P_I$. An accumulator 644d accumulates the output of unit 642d and provides the input Q signal power, $P_Q$.

A unit 638a normalizes the correlated IM3 I power $C_{3I}$ based on the powers $P_I$ and $P_{im3I}$ and provides a correlation result $\rho_{3I}$ for the I signal. A unit 638b normalizes the correlated IM3 Q power $C_{3Q}$ based on the powers $P_Q$ and $P_{im3Q}$ and provides a correlation result $\rho_{3Q}$ for the Q signal. The correlation results for IM3 may be expressed as:

$$\rho_{3I} = \frac{1}{P_I P_{im3I}} \cdot \left| \sum_n I_{im3}(n) I_{in}(n) \right|^2, \text{ and} \qquad \text{Eq (7)}$$

-continued $$\rho_{3Q} = \frac{1}{P_Q P_{im3Q}} \cdot \left| \sum_n I_{im3}(n) Q_{in}(n) \right|^2,$$

where $I_{im3}(n)$ is the generated IM3 I component for sample period n, and $Q_{im3}(n)$ is the generated IM3 Q component for sample period n.

Figure 6C:
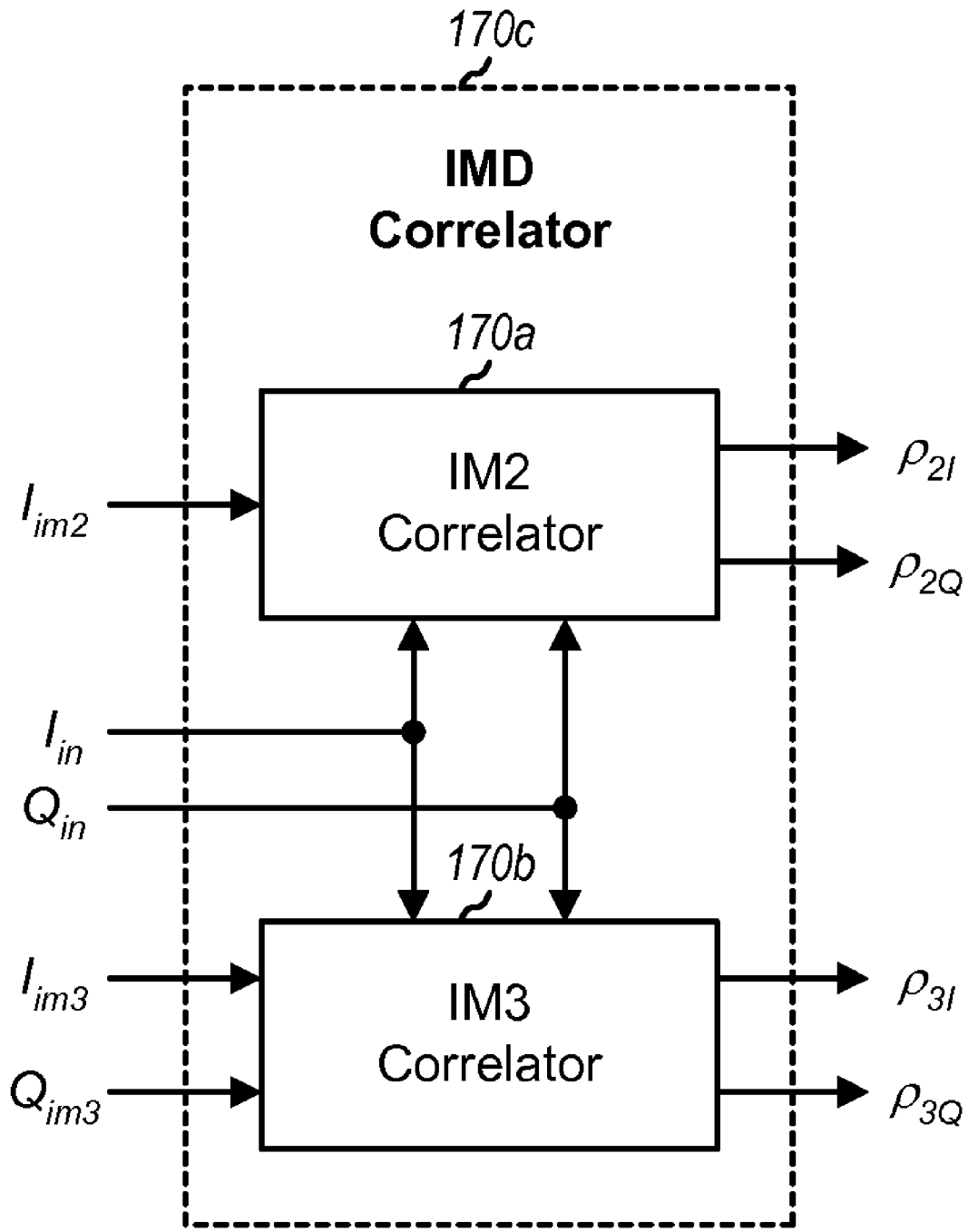

FIG. 6C shows a block diagram of a design of an IMD correlator 170c that digitally detects for IM2 and IM3 in the input I and Q signals. IMD correlator 170c may be used for IMD correlator 170 in FIGS. 3, 4A and 4B. IMD correlator 170c includes IM2 correlator 170a and IM3 correlator 170b. IM2 correlator 170a receives the digital IM2, $I_{im2}$, and the input I and Q signals, $I_{in}$ and $Q_{in}$, and generates correlation results $\rho_{2I}$ and $\rho_{2Q}$ for IM2, as described above for FIG. 6A. IM3 correlator 170b receives the digital IM3, $I_{im3}$ and $Q_{im3}$, and the input I and Q signals, $I_{in}$ and $Q_{in}$, and generates correlation results $\rho_{3I}$ and $\rho_{3Q}$ for IM3, as described above for FIG. 6B.

FIGS. 6A, 6B and 6C show three specific IMD correlator designs. Detection of IM2 and/or IM3 may also be performed in other manners.

In FIGS. 3 and 4A, IMD control unit 180 receives the correlation results from IMD correlator 170 and determines the IMD levels in the input I and Q signals. IMD control unit 180 may adjust the operation of one or more circuit blocks based on the detected IMD levels. The adjustment may be performed in various manners.

For IM2, IMD control unit 180 may adjust the operation of mixer 142 such that the correlation results $\rho_{2I}$ and $\rho_{2Q}$ are acceptable (e.g., minimal). Mixer 142 may include a first mixer for the I path and a second mixer for the Q path. IMD control unit 180 may adjust the symmetry of the first mixer such that the correlation result $\rho_{2I}$ is reduced and may adjust the symmetry of the second mixer such that the correlation result $\rho_{2Q}$ is reduced. IMD control unit 180 may also adjust the operation of LNA 140 and/or other circuit blocks to improve (e.g., reduce) IM2.

In one design, IM2 adjustment is performed in a closed loop manner. IMD control unit 180 may adjust the operation of mixer 142, LNA 140 and/or other circuit blocks in a closed loop manner by (a) monitoring the correlation results $\rho_{2I}$ and $\rho_{2Q}$ after each adjustment, (b) continuing to adjust in the same direction if the correlation results improve (e.g., decrease), and (c) adjusting in the opposite direction if the correlation results worsen (e.g., increase).

In another design, IM2 adjustment is performed based on a threshold. IMD control unit 180 may compare the correlation results $\rho_{2I}$ and $\rho_{2Q}$ against a threshold and declare strong IM2 level if the correlation results are above the threshold. If strong IM2 level is detected, then IMD control unit 180 may adjust the operation of mixer 142, LNA 140, and/or other circuit blocks.

For IM3, IMD control unit 180 may adjust the operation of LNA 140, mixer 142, and/or other circuit blocks such that the correlation results $\rho_{3I}$ and $\rho_{3Q}$ are acceptable. For example, the correlation results $\rho_{3I}$ and $\rho_{3Q}$ may be improved (e.g., reduced) by reducing the gain of LNA 140, by using more bias current for LNA 140 and/or mixer 142, by using higher supply voltage for LNA 140 and/or mixer 142, etc. IM3 adjustment may be performed in a closed loop manner, e.g., as described above for IM2. IM3 adjustment may also be performed based on a threshold, e.g., as also described above for IM2.

Figure 7:
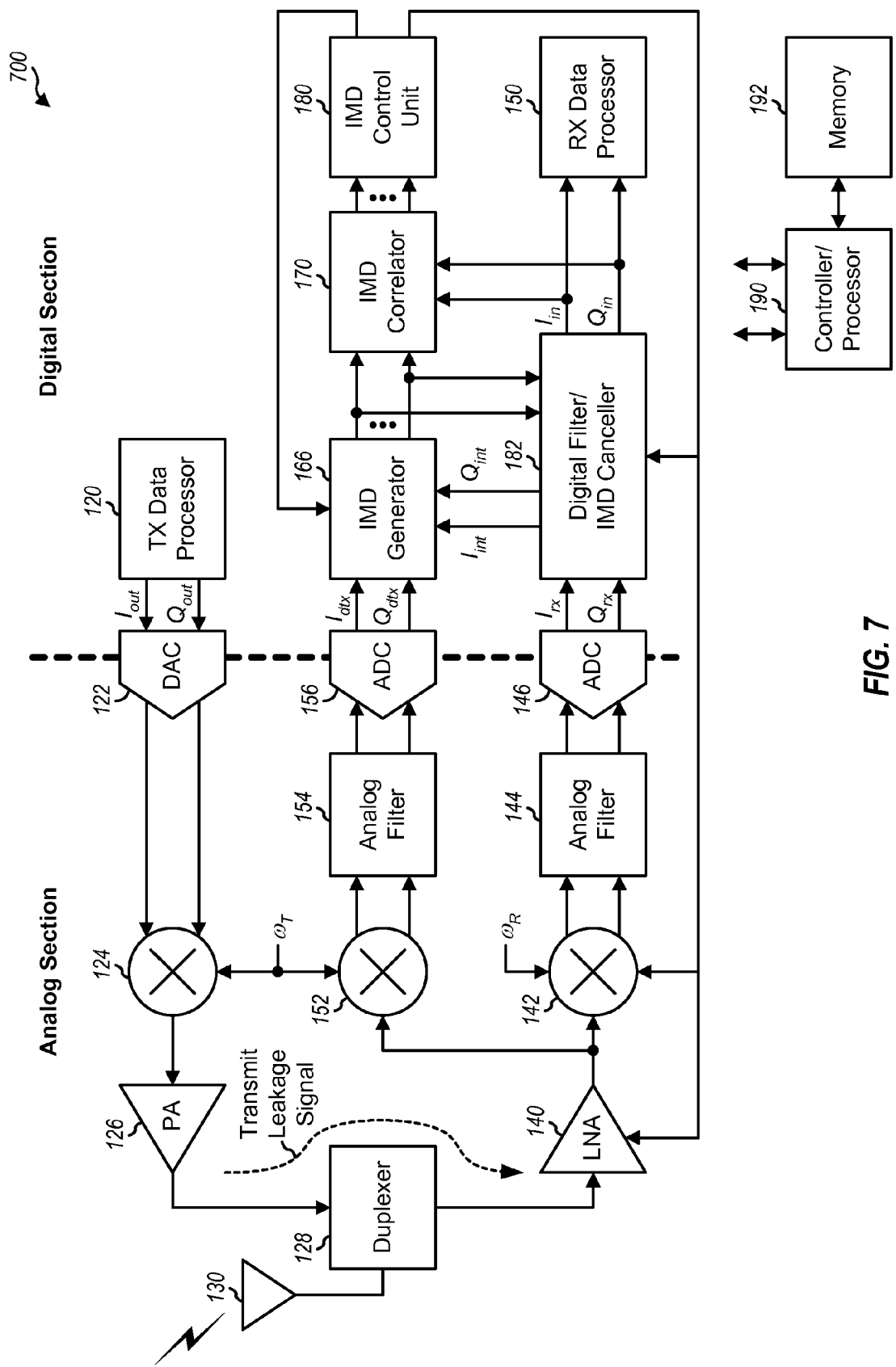
FIG. 7 shows a wireless device with digital IMD detection and cancellation.

FIG. 7 shows a block diagram of a design of a wireless device 700 with digital IMD detection and digital IMD cancellation. Wireless device 700 includes all of the units in wireless device 400 in FIG. 4A except for digital filter 148 and IMD generator 162. Wireless device 700 further includes an IMD generator 166 in place of IMD generator 162 and a digital filter/IMD canceller 182 in place of digital filter 148.

IMD generator 166 receives the downconverted I and Q signals, $I_{dtx}$ and $Q_{dtx}$, from ADC 156 (as shown in FIG. 7) or the downconverted signal, $D_{dtx}$, from ADC 176 (not shown in FIG. 7) and the intermediate I and Q signals, $I_{int}$ and $Q_{int}$, from digital filter/IMD canceller 182 and provides digital IM2 and IM3. Digital filter/IMD canceller 182 receives the digital IM2 and IM3 from IMD generator 166 and the digital received I and Q signals, $I_{rx}$ and $Q_{rx}$, from ADC 146. Digital filter 182 filters the received I and Q signals and provides the intermediate I and Q signals, $I_{int}$ and $Q_{int}$. IMD canceller 182 conditions the digital IM2 and IM3 to obtain conditioned IM2 and IM3 matching the IM2 and IM3 in the received I and Q signals and further subtracts or cancels the conditioned IM2 and IM3 from the received I and Q signals. Digital filter 182 further filters the I and Q signals after IMD cancellation and provides the input I and Q signals, $I_{in}$ and $Q_{in}$.

IMD correlator 170 receives the digital IM2 and IM3 from IMD generator 166 and the input I and Q signals, $I_{in}$ and $Q_{in}$, from digital filter/IMD canceller 182. IMD correlator 170 correlates the input I and Q signals with the generated IM2 and IM3 and provides correlation results. IMD control unit 180 detects the IMD levels based on the correlation results and adjusts the operation of various blocks such as IMD generator 166, IMD canceller 182, mixer 142, LNA 140, etc.

Figure 8:
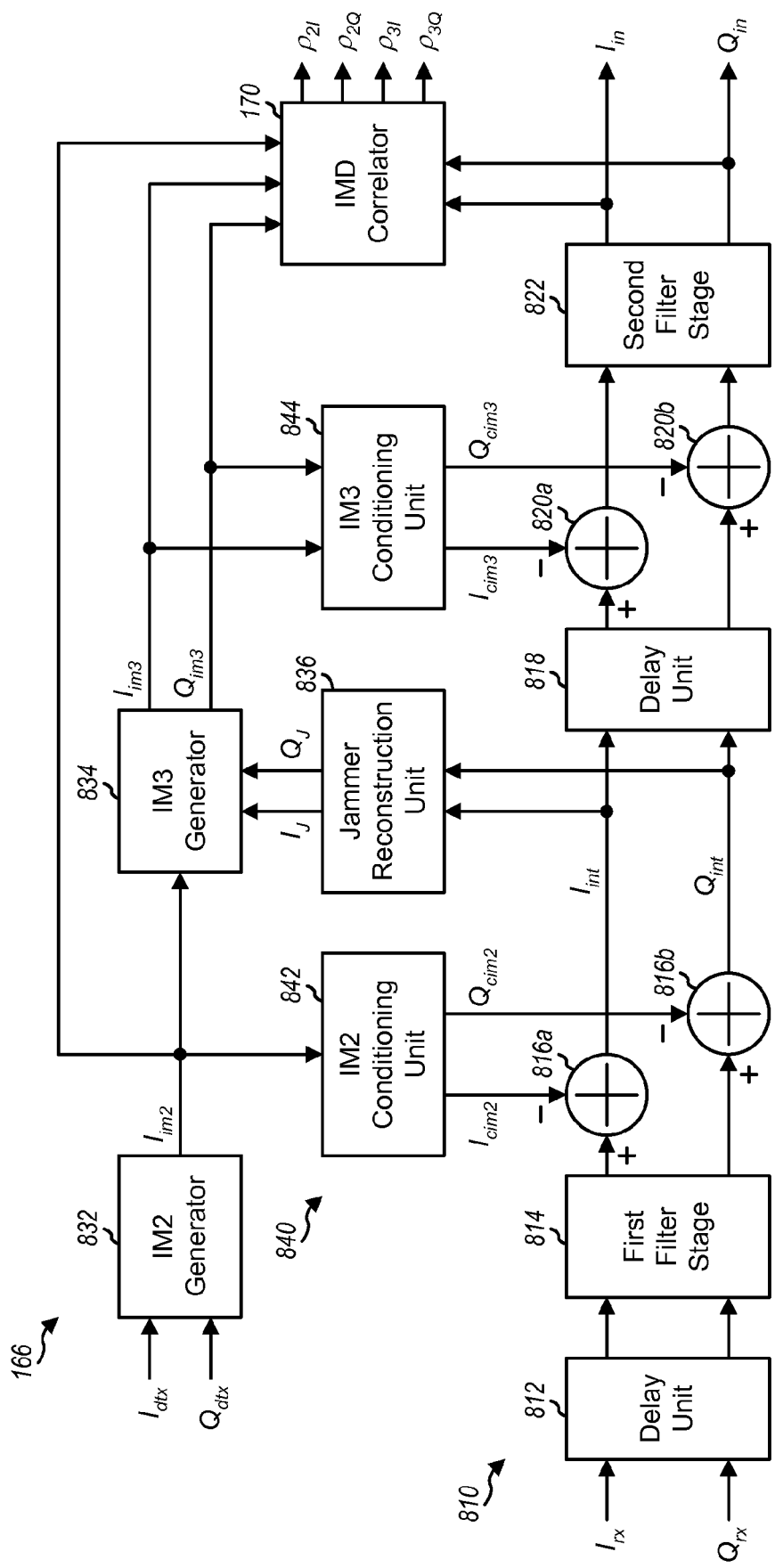
FIG. 8 shows an IMD generator and a digital filter/IMD canceller.

FIG. 8 shows a block diagram of a design of IMD generator 166 and digital filter/IMD canceller 182 in FIG. 7. IMD generator 166 includes an IM2 generator 832, an IM3 generator 834, and a jammer reconstruction unit 836. IM2 generator 832 receives the downconverted I and Q signals, $I_{dtx}$ and $Q_{dtx}$, from ADC 156 and provides the digital IM2, $I_{im2}$. IM2 generator 832 may be implemented with IM2 generator 162a in FIG. 5B, IM2 generator 162b in FIG. 5C, or some other IM2 generator. Jammer reconstruction unit 836 receives the intermediate I and Q signals, $I_{int}$ and $Q_{int}$, from digital filter/IMD canceller 182 and provides reconstructed jammer signals, $I_J$ and $Q_J$. Unit 836 may be implemented as described below. IM3 generator 834 receives the digital IM2 and the reconstructed jammer signals and provides digital IM3, $I_{im3}$ and $Q_{im3}$. IM3 generator 834 may be implemented with IM3 generator 580 in FIG. 5E or some other IM3 generator.

Digital filter/IMD canceller 182 includes a digital filter 810 and an IMD canceller 840. Digital filter 810 includes delay units 812 and 818, a first filter stage 814, and a second filter stage 822. First filter stage 814 may attenuate images and high frequency quantization noise from ADC 146. Second filter stage 822 may perform channel selection, jammer rejection, noise filtering, down sampling, etc.

IMD canceller 840 includes summers 816 and 820, an IM2 conditioning unit 842, and an IM3 conditioning unit 844. Unit 842 receives the digital IM2 from IM2 generator 832 and provides conditioned IM2, $I_{cim2}$ and $Q_{cim2}$. Unit 844 receives the digital IM3 from IM3 generator 834 and provides conditioned IM3, $I_{cim3}$ and $Q_{cim3}$. Units 842 and 844 may be implemented as described below.

Delay unit 812 delays the received I and Q signals, $I_{rx}$ and $Q_{rx}$, to match the delays of IM2 generator 832 and IM2 conditioning unit 842. Summer 816a subtracts the conditioned IM2 I component, $I_{cim2}$, from the I output of first filter stage 814 and provides the intermediate I signal, $I_{int}$. Summer 816b subtracts the conditioned IM2 Q component, $Q_{cim2}$, from the Q output of first filter stage 814 and provides the intermediate Q signal, $Q_{int}$. Delay unit 818 delays the intermediate I and Q signals to match the delays of IM3 generator 834 and IM3 conditioning unit 844. Summer 820a subtracts the conditioned IM3 I component, $I_{cim3}$, from the I output of delay unit 818. Summer 820b subtracts the conditioned IM3 Q component, $Q_{cim3}$, from the Q output of delay unit 818. Unit 842 and summers 816a and 816b perform IM2 cancellation. Unit 844 and summers 820a and 820b perform IM3 cancellation.

FIG. 8 shows a specific design of IMD generator 166 and digital filter/IMD canceller 182. IMD may also be cancelled in other manners. For example, IM2 and IM3 levels may be detected, IM2 may be canceled prior to IM3 if the IM2 level is higher than the IM3 level, and IM3 may be canceled prior to IM2 if the IM3 level is higher than the IM2 level.

FIG. 9A shows a block diagram of a design of an IMD conditioning unit 900. Unit 900 may be used for IM2 conditioning unit 842 in FIG. 8 and would then receive the digital IM2, $I_{im2}$ and $Q_{im2}$, for both I and Q inputs and provide the conditioned IM2, $I_{im2}$ and $Q_{cim2}$. Unit 900 may also be used for IM3 conditioning unit 844 and would then receive the digital IM3, $I_{im3}$ and $Q_{im3}$, for the I and Q inputs and provide the conditioned IM3, $I_{cim3}$ and $Q_{cim3}$.

Within IMD conditioning unit 900, gain units 910a and 910b scale the I and Q inputs with gains $g_I$ and $g_Q$, respectively. Filters 912a and 912b filter the outputs of gain units 910a and 910b, respectively, with adjustable filter responses. Delay units 914a and 914b delay the outputs of filters 912a and 912b, respectively, by variable amounts of delay. Filters 916a and 916b filter the outputs of delay units 914a and 914b, respectively, with adjustable filter responses and provide the conditioned IM2 or IM3.

IMD control unit 180 in FIG. 7 may receive correlation results for IM2 and IM3 and may adjust various units within IMD conditioning unit 900 such that the conditioned IM2 and IM3 match the received IM2 and IM3, respectively, as closely as possible. Gains $g_I$ and $g_Q$ may be selected such that the amplitude of the conditioned IM2 or IM3 matches the amplitude of the received IM2 or IM3. Filters 912a, 912b, 916a and 916b may be adjusted such that the frequency response of the conditioned IM2 or IM3 matches the frequency response of the received IM2 or IM3. For example, filters 912a and 912b may provide a roll-off or droop in the conditioned IM2 or IM3 to match a droop in the received I and Q signals due to various circuit blocks in the receive path. Delay units 914a and 914b may be adjusted such that the conditioned IM2 or IM3 is time aligned with the received IM2 or IM3. IMD control unit 180 may cycle through all adjustable parameters (e.g., gain, delay, frequency response, etc.) and may adjust one parameter at a time. For each parameter, IMD control unit 180 may apply different values and select the value that provides the lowest correlation results, which indicate better IMD cancellation. IMD control unit 180 may also adjust multiple or all parameters jointly.

In another design, an IMD conditioning unit is implemented with adaptive filters having coefficients that may be adjusted based on the correlation results. For example, an adaptive filter may receive $I_{im3}$ and generate $I_{cim3}$ based on a set of coefficients that may be adjusted based on correlation result $\rho_{3I}$. Adaptive filters may also be used to generate $I_{cim2}$, $Q_{cim2}$ and $Q_{cim3}$. The coefficient adjustment for the adaptive filters may be based on various adaptive algorithms such as least mean square (LMS), recursive least square (RLS), direct matrix inversion (DMI), etc.

FIG. 9B shows a block diagram of a design of jammer reconstruction unit 836 in FIG. 8. Within unit 836, gain units 920a and 920b receive and scale the intermediate I signal, $I_{int}$. Gain units 920c and 920d receive and scale the intermediate Q signal, $Q_{int}$. Gain units 920a through 920d may be used to correct I/Q amplitude imbalance. A summer 922a sums the scaled $I_{int}$ from unit 920a and the scaled $Q_{int}$ from unit 920c. A summer 922b sums the scaled $I_{int}$ from unit 920b and the scaled $Q_{int}$ from unit 920d. A filter 924a filters the output of summer 922a and provides the jammer I signal, $I_J$. A filter 924b filters the output of summer 922b and provides the jammer Q signal, $Q_J$. Filters 924a and 924b may undroop the reconstructed jammer I and Q signals to compensate for droop in the frequency response of the received path.

In FIGS. 3, 4A, 4B and 7, the transmit signal is a major contributor of IM2 and IM3. Since a major IM2 component is essentially the transmit signal squared, a version of the transmit signal may be obtained from either the digital output I and Q signals prior to DAC 122 (as shown in FIG. 3) or the digital downconverted I and Q signals from the second receive chain (as shown in FIGS. 4A and 7), or the digital IM2 signal (as shown in FIG. 4B). IM2 due to jammers may also be estimated by reconstructing jammers (e.g., as shown in FIG. 9B) and generating IM2 based on the reconstructed jammer signals in similar manner as the transmit signal.

Figure 10:
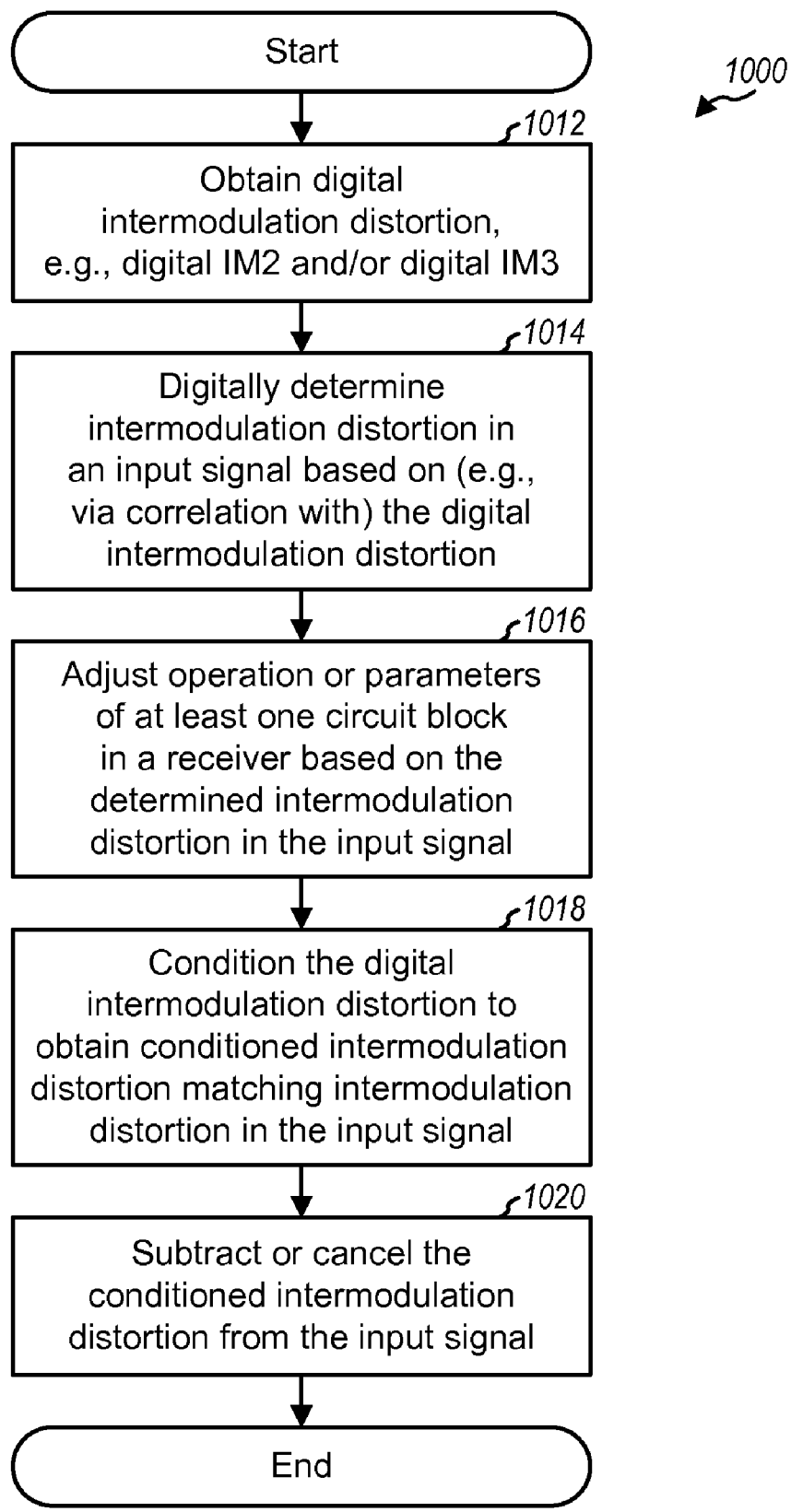
FIG. 10 shows a process for detecting and mitigating IMD.

FIG. 10 shows a process 1000 for detecting and mitigating IMD by a device, e.g., a wireless device such as a cellular phone. The device obtains digital intermodulation distortion (block 1012) and digitally determines intermodulation distortion in an input signal based on the digital intermodulation distortion (block 1014). The device may obtain digital IM2 and determine IM2 in the input signal based on the digital IM2. Alternatively or additionally, the device may obtain digital IM3 and determine IM3 in the input signal based on the digital IM3. The input signal may correspond to the input I and Q signals, the received I and Q signals, etc.

For block 1012, the device may digitally generate the intermodulation distortion (e.g., as shown in FIG. 3 or 4A) or may obtain the digital intermodulation distortion based on an analog signal containing intermodulation distortion (e.g., as shown in FIG. 4B). The device may digitally generate IM2 based on (a) a version of a transmit signal, e.g., digital output I and Q signals corresponding to a version of the transmit signal prior to digital-to-analog conversion, as shown in FIG. 3, or (b) digital downconverted I and Q signals corresponding to a version of the transmit signal after frequency upconversion and downconversion, as shown in FIG. 4A. The device may also obtain digital IM2 based on a squared version of the transmit signal, as shown in FIG. 4B. The device may digitally generate IM2 based on the squared magnitude of the output or downconverted I and Q signals. The device may digitally generate IM3 by multiplying the digitally generated IM2 with intermediate I and Q signals having jammers included therein. The device may obtain digital IM2 and/or IM3 with variable gain, variable delay, adjustable frequency response, DC offset removal, etc., for example, as shown in FIGS. 5A through 5E.

For block 1014, the device may correlate the digital intermodulation distortion with the input signal and determine the levels of intermodulation distortion in the input signal based on correlation results. For IM2, the device may correlate the digital IM2 with the input I and Q signals to obtain correlated IM2 I and Q powers, determine the power of the digital IM2, determine the powers of the input I and Q signals, and determine the correlation results for IM2 based on all of the powers, e.g., as shown in FIG. 6A and equation (6). For IM3, the device may correlate the digital IM3 I component with the input I signal to obtain correlated IM3 I power, correlate the digital IM3 Q component with the input Q signal to obtain correlated IM3 Q power, determine the powers of the digital IM3 I and Q components, determine the powers of the input I and Q signals, and determine the correlation results for IM3 based on the all of the powers, e.g., as shown in FIG. 6B and equation (7).

The device may adjust the operation of at least one circuit block in a receiver based on the determined intermodulation distortion in the input signal (block 1016). The adjustments may be based on the correlation results, as described above. For example, the device may adjust the operation of a mixer in the receiver based on the determined IM2, adjust the gain and/or linearity of an LNA in the receiver based on the determined IM3, etc. The device may perform the adjustment in a closed loop manner, based on a threshold, etc.

Alternatively or additionally, the device may condition the digital intermodulation distortion to obtain conditioned intermodulation distortion matching intermodulation distortion in the input signal (block 1018) and may subtract or cancel the conditioned intermodulation distortion from the input signal (block 1020). The device may derive conditioned IM2 based on the digital IM2 and subtract the conditioned IM2 from the input signal. The device may also derive conditioned IM3 based on the digital IM3 and subtract the conditioned IM3 from the input signal. The device may derive conditioned IM2 and/or IM3 with variable gain, variable delay, adjustable frequency response, etc., to achieve good cancellation of IM2 and/or IM3.

The digital intermodulation distortion may thus be used to (a) adjust the operation of at least one circuit block in the receiver, as shown in block 1016, (b) derive conditioned intermodulation distortion and cancel the conditioned intermodulation distortion from the input signal, as shown in blocks 1018 and 1020, or (c) both adjust the operation of at least one circuit block as well as derive conditioned intermodulation distortion and cancel the conditioned intermodulation distortion from the input signal.

The techniques described herein may provide certain advantages. First, analog circuit blocks (e.g., mixer 142) may be calibrated on the fly, which may result in cost saving by not performing factory calibration. Furthermore, on-the-fly calibration may be able to account for variations over temperature, power supply, etc. Second, improved performance may be achieved by mitigating IM2 and/or IM3 as described above. Third, the techniques may allow for omission of external analog filters in the receiver (e.g., after LNA 140) and/or allow for use of analog circuitry (e.g., mixer 142) designed with less stringent intermodulation specifications, which may reduce cost and lower power consumption.

The IMD detection and mitigation techniques described herein may be implemented by various means. For example, these techniques may be implemented in hardware, firmware, software, or a combination thereof. For a hardware implementation, the processing units used for IMD detection and mitigation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 192) and executed by a processor (e.g., processor 190). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
    at least one processor configured to obtain digital intermodulation distortion and to digitally determine intermodulation distortion in an input signal based on the digital intermodulation distortion, said at least one processor comprising:
    an intermodulation distortion (IMD) generator;
    an IMD correlator; and
    an IMD control unit, wherein the IMD generator receives inphase and quadrature transmit signals and generates IMD based on the received transmit signals, the IMD correlator receives the generated IMD and intermediate inphase and quadrature received signals and generates correlation results, and the IMD control unit generates one or more controls for one or more circuit blocks to reduce the detected IMD levels; and
    a memory coupled to the at least one processor.

2. The apparatus of claim 1, wherein the at least one processor is configured to obtain digital second order intermodulation distortion (IM2) as the IMD and to digitally determine IM2 in the input signal based on the digital IM2.

3. The apparatus of claim 1, wherein the at least one processor is configured to obtain digital third order intermodulation distortion (IM3) as the IMD and to digitally determine IM3 in the input signal based on the digital IM3.

4. The apparatus of claim 1, wherein the at least one processor is configured to obtain the digital IMD based on a version of the received transmit signal.

5. The apparatus of claim 1, wherein the at least one processor is configured to obtain the digital IMD based on digital inphase (I) and quadrature (Q) signals corresponding to a version of the received transmit signal prior to digital-to-analog conversion.

6. The apparatus of claim 1, wherein the at least one processor is configured to obtain the digital IMD based on digital inphase (I) and quadrature (Q) signals corresponding to a version of the received transmit signal after frequency upconversion and downconversion.

7. The apparatus of claim 1, wherein the at least one processor is configured to obtain the digital IMD based on a squared version of the received transmit signal obtained by squaring in analog domain.

8. The apparatus of claim 1, wherein the at least one processor is configured to obtain digital second order intermodulation distortion (IM2) based on squared magnitude of digital inphase (I) and quadrature (Q) signals.

9. The apparatus of claim 8, wherein the at least one processor is configured to obtain digital IM2 with at least one of a variable gain, a variable delay, and an adjustable frequency response.

10. The apparatus of claim 8, wherein the at least one processor is configured to obtain digital IM2 by removing direct current (DC) offset.

11. The apparatus of claim 1, wherein the at least one processor is configured to obtain digital second order intermodulation distortion (IM2) and to obtain digital third order intermodulation distortion (IM3) based on the digital IM2.

12. The apparatus of claim 11, wherein the at least one processor is configured to obtain digital IM3 by multiplying the digital IM2 with inphase (I) and quadrature (Q) signals having jammers included therein.

13. The apparatus of claim 12, wherein the at least one processor is configured to generate the I and Q signals having jammers included therein based on the input signal.

14. The apparatus of claim 11, wherein the at least one processor is configured to obtain digital IM3 with at least one of a variable gain, a variable delay, and an adjustable frequency response.

15. The apparatus of claim 1, wherein the at least one processor is configured to correlate the digital intermodulation distortion with the input signal and to determine intermodulation distortion in the input signal based on correlation results.

16. The apparatus of claim 1, wherein the input signal comprises input inphase (I) and quadrature (Q) signals, and wherein the at least one processor is configured to obtain digital second order intermodulation distortion (IM2) and to correlate the digital IM2 with the input I and Q signals to obtain correlated IM2 I and Q powers.

17. The apparatus of claim 16, wherein the at least one processor is configured to determine power of the digital IM2, to determine powers of the input I and Q signals, and to determine correlation results based on the correlated IM2 I and Q powers, the power of the digital IM2, and the powers of the input I and Q signals.

18. The apparatus of claim 1, wherein the input signal comprises input inphase (I) and quadrature (Q) signals, and wherein the at least one processor is configured to obtain digital I and Q components of third order intermodulation distortion (IM3), to correlate the digital IM3 I component with the input I signal to obtain correlated IM3 I power, and to correlate the digital IM3 Q component with the input Q signal to obtain correlated IM3 Q power.

19. The apparatus of claim 18, wherein the at least one processor is configured to determine powers of the digital IM3 I and Q components, to determine powers of the input I and Q signals, and to determine correlation results based on the correlated IM3 I and Q powers, the powers of the digital IM3 I and Q components, and the powers of the input I and Q signals.

20. The apparatus of claim 1, wherein the at least one processor is configured to adjust operation of at least one circuit block in a receiver based on the determined intermodulation distortion in the input signal.

21. The apparatus of claim 20, wherein the at least one processor is configured to adjust the operation of the at least one circuit block in a closed loop to reduce the determined intermodulation distortion.

22. The apparatus of claim 1, wherein the at least one processor is configured to adjust operation of a mixer in a receiver based on determined second order intermodulation distortion (IM2) in the input signal.

23. The apparatus of claim 1, wherein the at least one processor is configured to adjust gain, or linearity, or both gain and linearity of a low noise amplifier (LNA) in a receiver based on determined third order intermodulation distortion (IM3) in the input signal.

24. The apparatus of claim 1, wherein the at least one processor is configured to condition the digital intermodulation distortion to obtain conditioned intermodulation distortion matching intermodulation distortion in the input signal, and to subtract the conditioned intermodulation distortion from the input signal.

25. The apparatus of claim 24, wherein the at least one processor is configured to condition the digital intermodulation distortion with at least one of a variable gain, a variable delay, and an adjustable frequency response.

26. The apparatus of claim 1, wherein the at least one processor is configured to obtain digital second order intermodulation distortion (IM2), to condition the digital IM2 to obtain conditioned IM2 matching IM2 in the input signal, and to subtract the conditioned IM2 from the input signal.

27. The apparatus of claim 1, wherein the at least one processor is configured to obtain digital third order intermodulation distortion (IM3), to condition the digital IM3 to obtain conditioned IM3 matching IM3 in the input signal, and to subtract the conditioned IM3 from the input signal.

28. A method comprising:
obtaining digital intermodulation distortion, wherein obtaining digital intermodulation distortion comprises:
receiving inphase and quadrature transmit signals; and
generating the digital intermodulation distortion based on the received transmit signals;
correlating the generated digital intermodulation distortion with intermediate inphase and quadrature received signals to generate correlation results; and
generating one or more controls for one or more circuit blocks to reduce the detected digital intermodulation distortion levels based upon the generated correlation results.

29. The method of claim 28, wherein the obtaining digital intermodulation distortion comprises
obtaining digital second order intermodulation distortion (IM2), and
obtaining digital third order intermodulation distortion (IM3) based on the digital IM2.

30. The method of claim 28, further comprising:
adjusting operation of at least one circuit block in a receiver based on the determined intermodulation distortion in the input signal.

31. The method of claim 28, further comprising:
conditioning the digital intermodulation distortion to obtain conditioned intermodulation distortion matching intermodulation distortion in the input signal; and
subtracting the conditioned intermodulation distortion from the input signal.

32. An apparatus comprising:
means for obtaining digital intermodulation distortion, wherein the means for obtaining digital intermodulation distortion comprises:
means for receiving inphase and quadrature transmit signals; and
means for generating the digital intermodulation distortion based on the received transmit signals;
means for correlating the generated digital intermodulation distortion with intermediate inphase and quadrature received signals to generate correlation results; and means for generating one or more controls for one or more circuit blocks to reduce the detected digital intermodulation distortion levels based upon the generated correlation results.

33. The apparatus of claim 32, further comprising:

means for adjusting operation of at least one circuit block in a receiver based on the determined intermodulation distortion in the input signal.

34. The apparatus of claim 32, further comprising:

means for conditioning the digital intermodulation distortion to obtain conditioned intermodulation distortion matching intermodulation distortion in the input signal; and means for subtracting the conditioned intermodulation distortion from the input signal.

35. A processor readable media for storing instructions operable to:

receive inphase and quadrature transmit signals;

obtain digital intermodulation distortion based on the received transmit signals;

correlate the obtained digital intermodulation distortion with intermediate inphase and quadrature received signals to generate correlation results; and generating one or more controls for one or more circuit blocks to reduce the detected digital intermodulation distortion levels based upon the correlation results.

36. The processor readable media of claim 35, further comprising instructions to:

condition the digital intermodulation distortion to obtain conditioned intermodulation distortion matching intermodulation distortion in the input signal; and subtract the conditioned intermodulation distortion from the input signal.

37. The processor readable media of claim 35, further comprising instructions to:

obtain digital second order intermodulation distortion (IM2), and obtain digital third order intermodulation distortion (IM3) based on the digital IM2.

38. The processor readable media of claim 35, further comprising instructions to:

adjust operation of at least one circuit block in a receiver based on the determined intermodulation distortion in the input signal.

* * * * *